United States Patent
Morise et al.

(10) Patent No.: US 7,104,910 B2
(45) Date of Patent: Sep. 12, 2006

(54) HYDRAULIC CONTROL APPARATUS FOR HYDRAULICALLY OPERATED MECHANICAL APPARATUS

(75) Inventors: Masaru Morise, Nukata-gun (JP); Akio Sugawara, Toyota (JP); Hideki Miyata, Okazaki (JP); Yuji Yasuda, Nishikamo-gun (JP); Hiromichi Kimura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 199 days.

(21) Appl. No.: 10/876,692

(22) Filed: Jun. 28, 2004

(65) Prior Publication Data
US 2005/0003921 A1   Jan. 6, 2005

(30) Foreign Application Priority Data
Jul. 3, 2003   (JP)   ............................. 2003-270848

(51) Int. Cl.
*F16H 61/00*   (2006.01)
(52) U.S. Cl. .................. 475/119; 475/127; 477/906
(58) Field of Classification Search ................ 475/119, 475/123, 127
See application file for complete search history.

(56) References Cited

U.S. PATENT DOCUMENTS 4,995,285 A * 2/1991 Hayakawa et al. ......... 477/125
6,634,991 B1 * 10/2003 Itou et al. .................... 475/119

FOREIGN PATENT DOCUMENTS

| JP | 2000-249219 | 9/2000 |
| JP | 2001-248723 | 9/2001 |

* cited by examiner

*Primary Examiner*—Sherry Estremsky
(74) *Attorney, Agent, or Firm*—Oblon, Spivak, McClelland, Maier & Neustadt, P.C.

(57) ABSTRACT

A hydraulic control apparatus for switching an operation of a hydraulically operated mechanical apparatus, by selectively operating two frictional engagement elements of a first, a second, a third, and a fifth frictional engagement elements, the hydraulic control apparatus including a first control valve which, in association with an event that respective hydraulic pressures to operate the first and second frictional engagement elements are both produced, drains one of the third and fifth frictional engagement elements and outputs a control hydraulic pressure; and a second control valve which, when at least two hydraulic pressures of (a) the control hydraulic pressure and (b) respective hydraulic pressures to operate the third and fifth frictional engagement elements are supplied to the second control valve, drains the other of the third and fifth frictional engagement elements.

13 Claims, 7 Drawing Sheets

FIG.2

|     | C1 | C2 | B1 | B2 | B3 | F |
|-----|----|----|----|----|----|----|
| Rev |    |    |    | ○  | ○  |   |
| 1st | ○  |    |    | ◎  |    | ○ |
| 2nd | ○  |    | ○  |    |    |   |
| 3rd | ○  |    |    |    | ○  |   |
| 4th | ○  | ○  |    |    |    |   |
| 5th |    | ○  |    |    | ○  |   |
| 6th |    | ○  | ○  |    |    |   |

HYDRAULIC CONTROL APPARATUS FOR HYDRAULICALLY OPERATED MECHANICAL APPARATUS

The present application is based on Japanese Patent Application No. 2003-270848 filed on Jul. 3, 2003, the contents of which are incorporated herein by reference.

BACKGROUND OF THE INVENTION

1. Field of the Invention

The present invention relates to a hydraulic control apparatus which is preferably used to control, e.g., an automatic transmission of a vehicle, and in particular to the art of draining a frictional engagement element when an electric system fails.

2. Discussion of Related Art

There is known a hydraulic control apparatus which controls an operation of a hydraulically operated mechanical apparatus. One example of the hydraulic control apparatus is for hydraulically controlling a vehicle's automatic transmission including a plurality of hydraulically operated frictional coupling devices that are selectively operated to establish an appropriate one of a plurality of speed steps of the automatic transmission. The hydraulic control apparatus includes a plurality of electromagnetic valve devices which cooperate with each other to change the combination of respective operations of the frictional coupling devices and thereby establish one of the speed steps. Usually, the hydraulic control apparatus additionally includes an electronic control device which electrically controls the electromagnetic valve devices so as to establish one of multiple speed steps, e.g., five or six forward speed steps, depending upon an operating (e.g., running) state of the vehicle.

Meanwhile, it can be predicted that an electric system of a hydraulic control apparatus will halt its operation for some reason, i.e., so-called "fail". In order to deal with the predictable fail, it is needed to introduce a fail-safe technique when the hydraulic control apparatus is originally designed. To this end, it has been proposed to introduce the art of preventing interlocking, into a hydraulic control apparatus for a vehicle's automatic transmission. This is disclosed by, e.g., Japanese Patent Publication No. P2001-248723A. The disclosed hydraulic control apparatus employs a fail-safe valve which shuts off an appropriate hydraulic passage, when at least two hydraulic pressures of (a) a signal hydraulic pressure that is outputted from a signal-hydraulic-pressure composing valve when two frictional engagement elements belonging to a first group are both operated or engaged, and (b) respective hydraulic pressures that are outputted to operate a plurality of frictional engagement elements belonging to a second group are supplied to the fail-safe valve. Therefore, the hydraulic control apparatus can stop, when the electric system fails, the supplying of hydraulic pressure to an appropriate frictional engagement element, and thereby prevent the occurrence of interlocking.

SUMMARY OF THE INVENTION

However, according to the above-indicated, conventional fail-safe technique, for example, in the case where the automatic transmission employs five frictional engagement elements to establish six forward speed steps, a valve member of the fail-safe valve needs to have, in an axial direction thereof, at least three steps or diameter differences. Thus, the valve member needs to have a high degree of coaxiality and accordingly needs to be worked in a complex and difficult manner. This leads to increasing the size of the fail-safe valve or the hydraulic control apparatus.

It is therefore an object of the present invention to provide a hydraulic control apparatus which can drain, when, e.g., an electric system fails, an appropriate frictional engagement element and which can enjoy a sufficiently small size.

According to a first aspect of the present invention, there is provided a hydraulic control apparatus for switching an operation of a hydraulically operated mechanical apparatus, by selectively operating two frictional engagement elements of a first, a second, a third, and a fifth frictional engagement elements, the hydraulic control apparatus comprising a first control valve which, in association with an event that respective hydraulic pressures to operate the first and second frictional engagement elements are both produced, drains one of the third and fifth frictional engagement elements and outputs a control hydraulic pressure; and a second control valve which, when at least two hydraulic pressures of (a) the control hydraulic pressure and (b) respective hydraulic pressures to operate the third and fifth frictional engagement elements are supplied to the second control valve, drains an other of the third and fifth frictional engagement elements.

The hydraulic control apparatus according to the first aspect of the present invention includes the first control valve which, in association with an event that respective hydraulic pressures to operate the first and second frictional engagement elements are produced, drains one of the third and fifth frictional engagement elements and outputs the control hydraulic pressure, and the second control valve which, when at least two hydraulic pressures of (a) the control hydraulic pressure and (b) respective hydraulic pressures to operate the third and fifth frictional engagement elements are supplied to the second control valve, drains the other of the third and fifth frictional engagement elements. Thus, the first control valve allows only one of the control hydraulic pressure and the hydraulic pressure to operate one of the third and fifth frictional engagement elements to be supplied to the second control valve. Therefore, a valve member of the second control valve has only to have, in an axial direction thereof, at most two steps or diameter differences. Thus, the present hydraulic control apparatus can drain, when an electric system of the hydraulically operated mechanical apparatus fails, an appropriate frictional engagement element, and can enjoy a sufficiently small size.

According to a preferred feature of the first aspect of the present invention, the hydraulic control apparatus is for switching the operation of the hydraulically operated mechanical apparatus, by selectively operating two frictional engagement elements of the first, the second, the third, a fourth, and the fifth frictional engagement elements, the first control valve drains, in association with an event that the respective hydraulic pressures to operate the first and second frictional engagement elements are both supplied to the first control valve, the one of the third and fifth frictional engagement elements and outputs the control hydraulic pressure, and the second control valve drains, when at least two hydraulic pressures of (a) the control hydraulic pressure and (b) respective hydraulic pressures to operate the third, fourth, and fifth frictional engagement elements are supplied to the second control valve, the other of the third and fifth frictional engagement elements, and the fourth frictional engagement element. Thus, the hydraulic control apparatus includes the first control valve which, in association with an event that the respective hydraulic pressures to operate the first and second frictional engagement elements are both supplied to the first control valve, drains one of the third and fifth frictional engagement elements and outputs the control hydraulic pressure, and the second control valve which, when at least two hydraulic pressures of (a) the control hydraulic pressure and (b) respective hydraulic pressures to operate the third, fourth, and fifth frictional engagement elements are supplied to the second control valve, drains the other of the third and fifth frictional engagement elements, and the fourth frictional engagement element. Therefore, the first control valve allows only one of the control hydraulic pressure and the hydraulic pressure to operate the third or fifth frictional engagement element to be supplied to the second control valve. Therefore, a valve member of the second control valve has only to have, in an axial direction thereof, at most two steps or diameter differences. Thus, the present hydraulic control apparatus can drain, when an electric system of the hydraulically operated mechanical apparatus fails, an appropriate frictional engagement element, and can enjoy a sufficiently small size. In addition, each of the third, fourth, and fifth frictional engagement elements may be supplied with an operating hydraulic pressure from a corresponding one of three electromagnetic valve devices via a single fail-safe valve (i.e., the first or second control valve) only. Thus, the size of the hydraulic control apparatus (e.g., a hydraulic control circuit) can be reduced without limiting an operating-state changing capability of the hydraulically operated mechanical apparatus (e.g., a running-speed changing capability of a vehicle's automatic transmission).

According to another feature of the first aspect of the present invention, the hydraulic control apparatus further comprises four hydraulic passages each of which supplies a hydraulic fluid to a corresponding one of the first, second, third, and fifth frictional engagement elements; and two signal-pressure hydraulic passages which supply the control hydraulic pressure, and the hydraulic pressure to operate the fifth frictional engagement element, respectively, to the second control valve, and each of which has a cross-section area smaller than a cross-section area of the each of the four hydraulic passages. According to this feature, the control hydraulic pressure, and the hydraulic pressure to operate the fifth frictional engagement element are supplied to the second control valve via the two signal-pressure hydraulic passages, respectively, each of which has a cross-section area smaller than a cross-section area of each of the four hydraulic passages each of which supplies a hydraulic fluid to a corresponding one of the first, second, third, and fifth frictional engagement elements. Thus, the size of the hydraulic control apparatus can be further reduced.

According to another feature of the first aspect of the present invention, the hydraulic control apparatus further comprising a first, a second, a third, and a fifth electromagnetic valve device; a first hydraulic passage which supplies, from the first electromagnetic valve device, a first hydraulic pressure to the first frictional engagement element and the first control valve; a second hydraulic passage which supplies, from the second electromagnetic valve device, a second hydraulic pressure to the second frictional engagement element and the first control valve; a third hydraulic passage which supplies, from the third electromagnetic valve device, a third hydraulic pressure to the third frictional engagement element via the second control valve; a fifth hydraulic passage which supplies, from the fifth electromagnetic valve device, a fifth hydraulic pressure to the fifth frictional engagement element via the first control valve; a first signal-pressure hydraulic passage which has a cross-section area smaller than a cross-section area of each of the first, second, third, and fifth hydraulic passages and which, when the first and second hydraulic pressures are inputted to the first control valve and accordingly the first control valve is switched to drain the fifth frictional engagement element, introduces the control hydraulic pressure outputted from the first control valve, to the second control valve; and a second signal-pressure hydraulic passage which has a cross-section area smaller than the cross-section area of said each of the first, second, third, and fifth hydraulic passages and which supplies the fifth hydraulic pressure to the second control valve, wherein when at least two hydraulic pressures of the control hydraulic pressure and the third and fifth hydraulic pressures are inputted to the second control valve, the second control valve is switched to drain the third frictional engagement element. Thus, the first control valve allows only one of the control hydraulic pressure and the hydraulic pressure to operate the fifth frictional engagement element to be supplied to the second control valve. Therefore, a valve member of the second control valve has only to have, in an axial direction thereof, at most two diameter differences. Thus, the present hydraulic control apparatus can drain, when an electric system of the hydraulically operated mechanical apparatus fails, an appropriate frictional engagement element, and can enjoy a sufficiently small size. In addition, each of the third and fifth frictional engagement elements may be supplied with an operating hydraulic pressure from a corresponding one of the third and fifth electromagnetic valve devices via a single fail-safe valve (i.e., the first or second control valve) only. Thus, the size of the hydraulic control apparatus can be reduced without limiting an operating-state changing capability of the hydraulically operated mechanical apparatus. Moreover, the control hydraulic pressure, and the hydraulic pressure to operate the fifth frictional engagement element are supplied to the second control valve via the first and second signal-pressure hydraulic passages, respectively, each of which has a cross-section area smaller than a cross-section area of each of the first, second, third, and fifth hydraulic passages each of which supplies a hydraulic fluid to a corresponding one of the first, second, third, and fifth frictional engagement elements. Thus, the size of the hydraulic control apparatus can be further reduced.

According to another feature of the first aspect of the present invention, the second control valve comprises a spool valve member which has a first, a second, and a third land having a first, a second, and a third diameter, respectively, that differ from each other in an order of description, and which is movable between a drain position at which the spool valve member drains the third frictional engagement element and a non-drain position at which the spool valve member does not drain the third frictional engagement element; a first hydraulic chamber which receives the third hydraulic pressure to operate the third frictional engagement element, so that the third hydraulic pressure acts on a pressure receiving area corresponding to a difference of the first and second diameters of the first and second lands and thereby produces a thrust to move the spool valve member toward the drain position; a third hydraulic chamber which receives the fifth hydraulic pressure to operate the fifth frictional engagement element, so that the fifth hydraulic pressure acts on a surface of an axial end of the third land and thereby produces a thrust to move the spool valve member toward the drain position; and a fourth hydraulic chamber which receives the control hydraulic pressure, so that the control hydraulic pressure acts on a surface of an axial end of the spool valve member and thereby produces a thrust to move the spool valve member toward the drain position. According to this feature, the hydraulic control apparatus employs the second control valve having a simple construction and accordingly can find an economic application to an automatic transmission which establishes each one of a plurality of speed steps by appropriately selecting and combining the respective operating states of the four frictional engagement elements.

According to another feature of the first aspect of the present invention, the hydraulic control apparatus further comprises a first, a second, a third, a fourth, and a fifth electromagnetic valve device; a first hydraulic passage which supplies, from the first electromagnetic valve device, a first hydraulic pressure to the first frictional engagement element and the first control valve; a second hydraulic passage which supplies, from the second electromagnetic valve device, a second hydraulic pressure to the second frictional engagement element and the first control valve; a third hydraulic passage which supplies, from the third electromagnetic valve device, a third hydraulic pressure to the third frictional engagement element via the second control valve; a fourth hydraulic passage which supplies, from the fourth electromagnetic valve device, a fourth hydraulic pressure to the fourth frictional engagement element via the second control valve; a fifth hydraulic passage which supplies, from the fifth electromagnetic valve device, a fifth hydraulic pressure to the fifth frictional engagement element via the first control valve; a first signal-pressure hydraulic passage which has a cross-section area smaller than a cross-section area of each of the first, second, third, fourth, and fifth hydraulic passages and which, when the first and second hydraulic pressures are inputted to the first control valve and accordingly the first control valve is switched to drain the fifth hydraulic passage, introduces the control hydraulic pressure outputted from the first control valve, to the second control valve; and a second signal-pressure hydraulic passage which has a cross-section area smaller than the cross-section area of the each of the first, second, third, fourth, and fifth hydraulic passages and which supplies the fifth hydraulic pressure to the second control valve, wherein when at least two hydraulic pressures of the control hydraulic pressure and the third, fourth, and fifth hydraulic pressures are inputted to the second control valve, the second control valve is switched to drain the third and fourth frictional engagement elements. According to this feature, the first control valve allows only one of the control hydraulic pressure, and the hydraulic pressure to operate the fifth frictional engagement element to be supplied to the second control valve. Therefore, a valve member of the second control valve has only to have, in an axial direction thereof, at most two diameter differences. Thus, the present hydraulic control apparatus can drain, when an electric system of the hydraulically operated mechanical apparatus fails, an appropriate frictional engagement element, and can enjoy a sufficiently small size. In addition, each of the third, fourth, and fifth frictional engagement elements may be supplied with an operating hydraulic pressure from a corresponding one of the third, fourth, and fifth electromagnetic valve devices via a single fail-safe valve (i.e., the first or second control valve) only. Thus, the size of the hydraulic control apparatus can be reduced without limiting an operating-state changing capability of the hydraulically operated mechanical apparatus. Moreover, the control hydraulic pressure, and the hydraulic pressure to operate the fifth frictional engagement element are supplied to the second control valve via the first and second signal-pressure hydraulic passages, respectively, each of which has a cross-section area smaller than a cross-section area of each of the first, second, third, fourth, and fifth hydraulic passages each of which supplies a hydraulic fluid to a corresponding one of the first, second, third, fourth, and fifth frictional engagement elements. Thus, the size of the hydraulic control apparatus can be further reduced. For example, the present hydraulic control apparatus can find an economic application to an automatic transmission which establishes each one of six forward speed steps by appropriately selecting and combining the respective operating states of the five frictional engagement elements.

According to another feature of the first aspect of the present invention, the second control valve comprises a spool valve member which has a first, a second, and a third land having a first, a second, and a third diameter, respectively, that differ from each other in an order of description, and which is movable between a drain position at which the spool valve member drains the third and fourth frictional engagement elements and a non-drain position at which the spool valve member does not drain the third and fourth frictional engagement elements; a plunger which is abuttable on an end portion of the spool valve member that is located on a side of the third land thereof, and which has a same diameter as the third diameter of the third land; a first hydraulic chamber which receives the third hydraulic pressure to operate the third frictional engagement element, so that the third hydraulic pressure acts on a pressure receiving area corresponding to a difference of the first and second diameters of the first and second lands and thereby produces a thrust to move the spool valve member toward the drain position; a second hydraulic chamber which receives the fourth hydraulic pressure to operate the fourth frictional engagement element, so that the fourth hydraulic pressure acts on a pressure receiving area corresponding to a difference of the second and third diameters of the second and third lands and thereby produces a thrust to move the spool valve member toward the drain position; a third hydraulic chamber which receives the fifth hydraulic pressure to operate the fifth frictional engagement element, so that the fifth hydraulic pressure acts on a surface of an axial end of the third land and thereby produces a thrust to move the spool valve member toward the drain position; and a fourth hydraulic chamber which receives the control hydraulic pressure, so that the control hydraulic pressure acts on a surface of one of axially opposite ends of the plunger that is remoter than an other end thereof from the third land and thereby produces a thrust to move the spool valve member toward the drain position. According to this feature, the hydraulic control apparatus employs the second control valve having a simple construction and accordingly can find an economic application to an automatic transmission which establishes each one of six forward speed steps by appropriately selecting and combining the respective operating states of the five frictional engagement elements.

According to a second aspect of the present invention, there is provided a hydraulic control apparatus for switching an operation of a hydraulically operated mechanical apparatus, by selectively operating two frictional engagement elements of a first, a second, a third, and a fifth frictional engagement elements, the hydraulic control apparatus comprising a first control valve which, in association with an event that respective hydraulic pressures to operate the first and second frictional engagement elements are both produced, drains one of the third and fifth frictional engagement elements and outputs a control hydraulic pressure; and a second control valve which, when one of (a) the control hydraulic pressure and (b) one of respective hydraulic pressures to operate the third and fifth frictional engagement elements are supplied to the second control valve, drains an other of the third and fifth frictional engagement elements.

The hydraulic control apparatus according to the second aspect of the present invention includes the first control valve which, in association with an event that respective hydraulic pressures to operate the first and second frictional engagement elements are both produced, drains one of the third and fifth frictional engagement elements and outputs a control hydraulic pressure; and the second control valve which, when one of (a) the control hydraulic pressure and (b) one of respective hydraulic pressures to operate the third and fifth frictional engagement elements are supplied to the second control valve, drains the other of the third and fifth frictional engagement elements. Thus, the first control valve allows only one of the control hydraulic pressure, and the hydraulic pressure to operate one of the third and fifth frictional engagement elements to be supplied to the second control valve. Therefore, a valve member of the second control valve has only to have, in an axial direction thereof, at least one step or diameter difference. Thus, the present hydraulic control apparatus can drain, when an electric system of the hydraulically operated mechanical apparatus fails, an appropriate frictional engagement element, and can enjoy a sufficiently small size.

According to a preferred feature of the second aspect of the present invention, the hydraulic control apparatus further comprising a first, a second, a third, and a fifth electromagnetic valve device; a first hydraulic passage which supplies, from the first electromagnetic valve device, a first hydraulic pressure to the first frictional engagement element and the first control valve; a second hydraulic passage which supplies, from the second electromagnetic valve device, a second hydraulic pressure to the second frictional engagement element and the first control valve; a third hydraulic passage which supplies, from the third electromagnetic valve device, a third hydraulic pressure to the third frictional engagement element via the second control valve; a fifth hydraulic passage which supplies, from the fifth electromagnetic valve device, a fifth hydraulic pressure to the fifth frictional engagement element via the first control valve; a first signal-pressure hydraulic passage which has a cross-section area smaller than a cross-section area of each of the first, second, third, and fifth hydraulic passages and which, when the first and second hydraulic pressures are inputted to the first control valve and accordingly the first control valve is switched to drain one of the third and fifth frictional engagement element, introduces the control hydraulic pressure outputted from the first control valve, to the second control valve; and a second signal-pressure hydraulic passage which has a cross-section area smaller than the cross-section area of said each of the first, second, third, and fifth hydraulic passages and which supplies one of the third and fifth hydraulic pressures to the second control valve, wherein when one of (a) the control hydraulic pressure and (b) said one of the third and fifth hydraulic pressures are inputted to the second control valve, the second control valve is switched to drain said other of the third and fifth frictional engagement elements. Thus, the first control valve allows only one of the control hydraulic pressure, and the hydraulic pressure to operate the third or fifth frictional engagement element to be supplied to the second control valve. Therefore, a valve member of the second control valve has only to have, in an axial direction thereof, at least one diameter difference. Thus, the present hydraulic control apparatus can drain, when an electric system of the hydraulically operated mechanical apparatus fails, an appropriate frictional engagement element, and can enjoy a sufficiently small size. In addition, each of the third and fifth frictional engagement elements may be supplied with an operating hydraulic pressure from a corresponding one of two electromagnetic valve devices via a single fail-safe valve (i.e., the first or second control valve) only. Thus, the size of the hydraulic control apparatus can be reduced without limiting an operating-state changing capability of the hydraulically operated mechanical apparatus. Moreover, the control hydraulic pressure, and the hydraulic pressure to operate the third or fifth frictional engagement element are supplied to the second control valve via the first and second signal-pressure hydraulic passages, respectively, each of which has a cross-section area smaller than a cross-section area of each of the first, second, third, and fifth hydraulic passages each of which supplies a hydraulic fluid to a corresponding one of the first, second, third, and fifth frictional engagement elements. Thus, the size of the hydraulic control apparatus can be further reduced.

According to another feature of the second aspect of the present invention, the second control valve comprises a spool valve member which has a second and a third land having a second and a third diameter, respectively, that differ from each other, and which is movable between a drain position at which the spool valve member drains the third frictional engagement element and a non-drain position at which the spool valve member does not drain the third frictional engagement element; a third hydraulic chamber which receives the fifth hydraulic pressure, so that the fifth hydraulic pressure acts on a pressure receiving area corresponding to a difference of the second and third diameters of the second and third lands and thereby produces a thrust to move the spool valve member toward the drain position; and a fourth hydraulic chamber which receives the control hydraulic pressure, so that the control hydraulic pressure acts on a surface of an axial end of the spool valve member and thereby produces a thrust to move the spool valve member toward the drain position. According to this feature, the hydraulic control apparatus employs the second control valve having a simple construction and accordingly can find an economic application to an automatic transmission which establishes each one of a plurality of speed steps by appropriately selecting and combining the respective operating states of the four frictional engagement elements.

According to another feature of the first or second aspect of the present invention, the first and third frictional engagement elements are both operated to establish a second operating state of the hydraulically operated mechanical apparatus; the first and fifth frictional engagement elements are both operated to establish a third operating state of the hydraulically operated mechanical apparatus; the first and second frictional engagement elements are both operated to establish a fourth operating state of the hydraulically operated mechanical apparatus; the second and fifth frictional engagement elements are both operated to establish a fifth operating state of the hydraulically operated mechanical apparatus; and the second and third frictional engagement elements are both operated to establish a sixth operating state of the hydraulically operated mechanical apparatus.

According to another feature of the second aspect of the present invention, the hydraulically operated mechanical apparatus comprises an automatic transmission of a vehicle that additionally includes a one-way clutch, and the first frictional engagement element, and one of the fourth frictional engagement element and the one-way clutch are both operated to establish a first speed step of the automatic transmission; the first and third frictional engagement elements are both operated to establish a second speed step of the automatic transmission; the first and fifth frictional engagement elements are both operated to establish a third speed step of the automatic transmission; the first and second frictional engagement elements are both operated to establish a fourth speed step of the automatic transmission; the second and fifth frictional engagement elements are both operated to establish a fifth speed step of the automatic transmission; and the second and third frictional engagement elements are both operated to establish a sixth speed step of the automatic transmission.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 2 is an operation table representing a relationship between a plurality of speed steps of an automatic transmission of the transmission system, shown in FIG. 1, and a plurality of combinations of respective operating states of a plurality of frictional engagement elements used to establish those speed steps;

DETAILED DESCRIPTION OF THE PREFERRED EMBODIMENTS

Hereinafter, there will be described preferred embodiments of the present invention by reference to the drawings.

Figure 1:
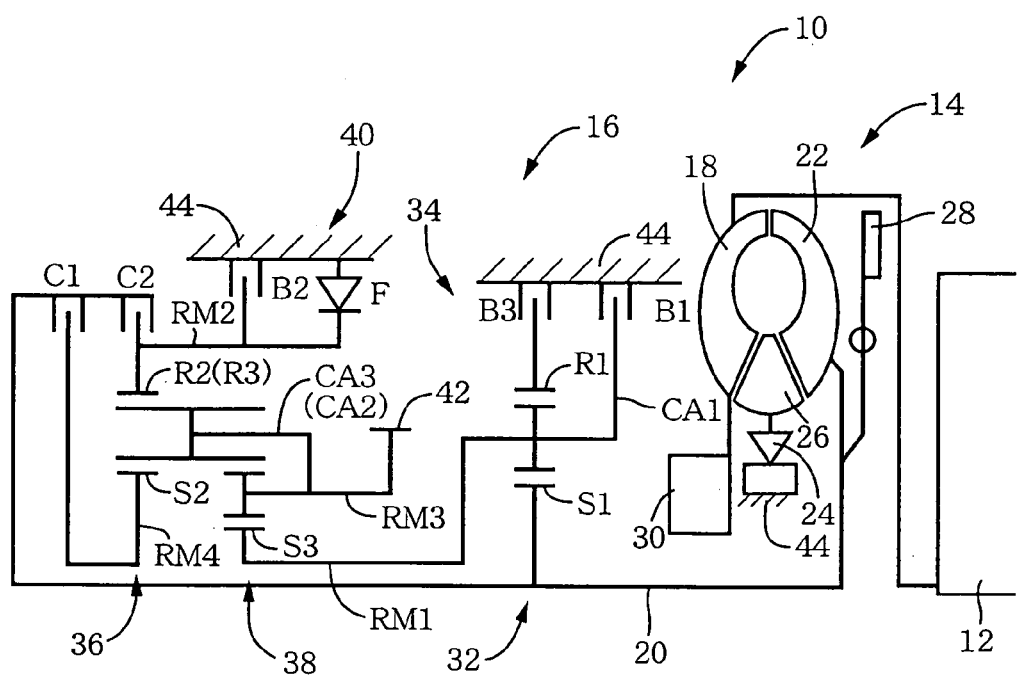
FIG. 1 is a schematic view of a driving force transmission system of a vehicle that employs a hydraulic control apparatus to which the present invention is applied.

FIG. 1 schematically shows a construction of a driving force transmission system 10 of a vehicle that includes a hydraulic control apparatus to which the present invention is applied. The driving force transmission system 10 is employed by, e.g., an FF (front-engine, front-drive) vehicle. The vehicle includes an engine 12 as a driving force source, and the driving force transmission system 10 includes a torque converter 14 and an automatic transmission 16. The driving force transmission system 10 has a construction which is substantially symmetrical with respect to its horizontal centerline, and a lower half portion of the same 10 is not shown in FIG. 1.

The engine 12 is an internal combustion engine that produces, by firing fuel, a driving force to drive or run the vehicle. The torque converter 14 includes a pump impeller 18 connected to a crankshaft of the engine 12; a turbine impeller 22 connected to a turbine shaft 20; and a stator impeller 26 whose rotation in one direction is inhibited by a one-way clutch 24, and the torque converter 14 amplifies the torque produced by the engine 12 and transmits the amplified torque to the automatic transmission 16. A lockup clutch 28 is provided between the pump impeller 18 and the turbine impeller 22, so that the pump impeller 18 and the turbine impeller 22 can be integrally connected to each other and can be rotated as an integral body. The pump impeller 18 is integrally provided with a hydraulic pump 30 which outputs, in synchronism with the rotation of the engine 12, a hydraulic fluid having an appropriate source hydraulic pressure. The pressurized hydraulic fluid is first supplied to a hydraulic control circuit 48, described later, and is subsequently supplied to the lockup clutch 28 and used to lubricate each portion of the automatic transmission 16.

The automatic transmission 16 includes a first transmission portion 34 which is essentially constituted by a single-pinion first planetary gear set 32, and a second transmission portion 40 which is essentially constituted by a single-pinion second planetary gear set 36 and a double-pinion third planetary gear set 38 and which is coaxial with the first transmission portion 34. The automatic transmission 16 is a hydraulically operated mechanical apparatus which includes a first clutch C1 as a first frictional engagement element, a second clutch C2 as a second frictional engagement element, a first brake B1 as a third frictional engagement element, a second brake B2 as a fourth frictional engagement element, and a third brake B3 as a fifth frictional engagement element, and which establishes an appropriate speed step by selectively operating appropriate two frictional engagement elements of the five frictional engagement elements. Each of the first and second clutches C1, C2 and the first, second, and third brakes B1, B2, B3 includes a plurality of friction plates, and is a hydraulically operated frictional coupling device that is engaged and disengaged by a hydraulic cylinder. In the automatic transmission 16, a rotation inputted from the turbine shaft 20 of the torque converter 14 is speed-changed at a speed-change ratio corresponding to each one of a plurality of speed steps, and the rotation is outputted from an output gear 42. The rotation outputted from the output gear 46 is transmitted via a differential gear unit, not shown, to a left and a right driving wheel of the vehicle.

The first planetary gear set 32 constituting the first transmission portion 34 includes three rotary elements, i.e., a sun gear S1, a carrier CA1, and a ring gear R1. When the sun gear S1, connected to the turbine shaft 20, is driven or rotated by the same 20, and the ring gear R1 is fixed via a third brake B3 to a housing 44 so that the ring gear R1 is not rotatable, the carrier CA1 functions as an intermediate output member such that the carrier CA1 is rotated at a speed lower than that of the turbine shaft 20. The second and third planetary gear sets 36, 38 constituting the second transmission portion 40 are partially connected to each other to provide four rotary elements RM1, RM2, RM3, RM4. More specifically described, a sun gear S3 of the third planetary gear set 38 provides the first rotary element RM1; respective ring gears R2, R3 of the second and third planetary gear sets 36, 38 are connected to each other to provide the second rotary element RM2; respective carriers CA2, CA3 of the second and third planetary gear sets 36, 38 are connected to each other to provide the third rotary element RM3; and a sun gear S2 of the second planetary gear set 36 provides the fourth rotary element RM4. That is, the second and third planetary gear sets 36, 38 provide a Ravigneaux-type planetary gear train in which the respective ring gears R2, R3 of the second and third planetary gear sets 36, 38 are constituted integrally with each other; the respective carriers CA2, CA3 of the second and third planetary gear sets 36, 38 are constituted by a common member; and the pinion gears of the first planetary gear set 36 also function as the second pinion gears of the third planetary gear set 38.

The first rotary element RM1 is selectively connected, by the first brake B1, to the housing 44, so that the first rotary element RM1 is inhibited from being rotated relative to the housing 44; the second rotary element RM2 is selectively connected, by the second brake B2, to the housing 44, so that the second rotary element RM2 is inhibited from being rotated relative to the housing 44; the fourth rotary element RM4 is selectively connected, by the first clutch C1, to the turbine shaft 20, so that the fourth rotary element RM4 is rotated integrally with the turbine shaft 20; the second rotary element RM2 is selectively connected, by the second clutch C2, to the turbine shaft 20, so that the second rotary element RM2 is rotated integrally with the turbine shaft 20; the first rotary element RM1 is integrally connected to the carrier CA1 of the first planetary gear set 40 that functions as the intermediate output member, so that the first rotary element RM1 is rotated integrally with carrier CA1 and thereby outputs the rotation; and the third rotary element RM3 is integrally connected to the output gear 42, so that the third rotary element RM3 is rotated integrally with the output gear 42 and thereby outputs the rotation. A one-way clutch F is provided between the second rotary element RM2 and the housing 44, such that the one-way clutch F is parallel to the second brake B2, and the one-way clutch F allows the second rotary element RM2 to be rotated in a forward direction, i.e., the same direction as the direction of rotation of the turbine shaft 20, while inhibiting the same RM2 from being rotated in the opposite direction.

Figure 2:
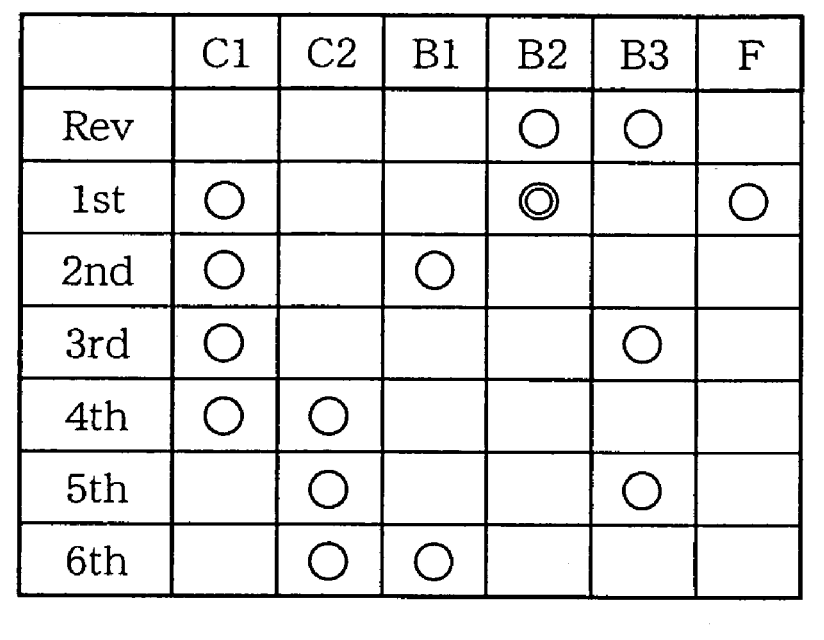

FIG. 2 shows an operation table representing a relationship between the speed steps of the automatic transmission 16, and a plurality of combinations of respective operating states of the first and second clutches C1, C2, the first, second, and third brakes B1 through B3, and the one-way clutch F to establish those speed steps. In the operation table, symbol "◯" indicates an operated or engaged state of each clutch C, brake B, or one-way clutch F; and symbol "◉" indicates an operated or engaged state of the second brake B2 when, e.g., an engine brake is operated. Since the second brake B2 used to establish the first speed step "$1^{st}$" is associated with the one-way clutch F, such that the two elements B2, F are parallel to each other, it is not essentially needed to operate the second brake B2 while the vehicle is accelerated. In addition, respective speed-change ratios of the speed steps shown in FIG. 2 are defined by respective gear ratios of the first, second, and third planetary gear units 32, 36, 38.

More specifically described, when the first clutch C1 and the second brake B2 (or the one-way clutch F substituting the second brake B2) are operated so that the fourth rotary element RM4 is rotated integrally with the turbine shaft 20 and the second rotary element RM2 is inhibited from being rotated relative to the housing 44, the third rotary element RM3 connected to the output gear 42 is rotated at a rotation speed corresponding to the first speed step "$1^{st}$" having the greatest speed-change ratio. When the first clutch C1 and the first brake B1 are operated so that the fourth rotary element RM4 is rotated integrally with the turbine shaft 20 and the first rotary element RM1 is inhibited from being rotated relative to the housing 44, the third rotary element RM3 is rotated at a rotation speed corresponding to the second speed step "$2^{nd}$" having a smaller speed-change ratio than that of the first speed step "$1^{st}$". When the first clutch C1 and the third brake B3 are operated so that the fourth rotary element RM4 is rotated integrally with the turbine shaft 20 and the first rotary element RM1 is rotated at a speed reduced by the first transmission portion 34, the third rotary element RM3 is rotated at a rotation speed corresponding to the third speed step "$3^{rd}$" having a smaller speed-change ratio than that of the second speed step "$2^{nd}$". When the first and second clutches C1, C2 are operated so that the second transmission portion 40 is rotated integrally with the turbine shaft 20, the third rotary element RM3 is rotated at the same rotation speed as that of the second transmission portion 40, i.e., a rotation speed corresponding to the fourth speed step "$4^{th}$" having a smaller speed-change ratio than that of the third speed step "$3^{rd}$". The speed-change ratio of the fourth speed step is 1.0. When the second clutch C2 and the third brake B3 are operated so that the second rotary element RM2 is rotated integrally with the turbine shaft 20 and the first rotary element RM1 is rotated at a speed reduced by the first transmission portion 34, the third rotary element RM3 is rotated at a rotation speed corresponding to the fifth speed step "$5^{th}$" having a smaller speed-change ratio than that of the fourth speed step "$4^{th}$". When the second clutch C2 and the first brake B1 are operated so that the second rotary element RM2 is rotated integrally with the turbine shaft 20 and the first rotary element RM1 is inhibited from being rotated relative to the housing 44, the third rotary element RM3 is rotated at a rotation speed corresponding to the sixth speed step "$6^{th}$" having a smaller speed-change ratio than that of the fifth speed step "$5^{th}$". When the second and third brakes B2, B3 are operated so that the second rotary element RM2 is inhibited from being rotated relative to the housing 44 and the first rotary element RM1 is rotated at a speed reduced by the first transmission portion 34, the third rotary element RM3 is rotated in a reverse direction at a rotation speed corresponding to the reverse speed-step "Rev" used to run the vehicle in a backward direction.

As is apparent from the operation table shown in FIG. 2, when appropriate two frictional engagement elements of the five frictional engagement elements, i.e., the first and second clutches C1, C2 and the first, second, and third brakes B1, B2, B3 are operated or engaged, a corresponding one of the second to sixth forward speed steps of the automatic transmission 16 is established. However, if three or more frictional engagement elements of the five frictional engagement elements are simultaneously operated, no normal speed steps can be established. In addition, each one of the second, third, fifth, and sixth forward speed steps, except for the fourth forward speed step, is established by operating one of the first and second clutches C1, C2 and one of the first and third brakes B1, B3. Therefore, when a hydraulic pressure $P_{C1}$ used to operate or engage the first clutch C1, and a hydraulic pressure $P_{C2}$ used to operate or engage the second clutch C2 are both produced, and present, and accordingly a fourth-speed-step hydraulic pressure $P_{4th}$, described later, which is outputted from a first control valve 92 is produced, and present, the automatic transmission 16 can be judged as being in a fail state, if at least one of a hydraulic pressure $P_{B1}$ used to operate or engage the first brake B1, a hydraulic pressure $P_{B2}$ used to operate or engage the second brake B2, and a hydraulic pressure $P_{B3}$ used to operate or engage the third brake B3 is produced, and present. In addition, no speed steps of the automatic transmission 16 are established by operating simultaneously the first and third brakes B1, B3. Therefore, if the hydraulic pressure $P_{B1}$ used to operate the first brake B1 and the hydraulic pressure $P_{B3}$ used to operate the third brake B3 are simultaneously produced, and present, the automatic transmission 16 can be judged as being in a fail state.

Figure 3:
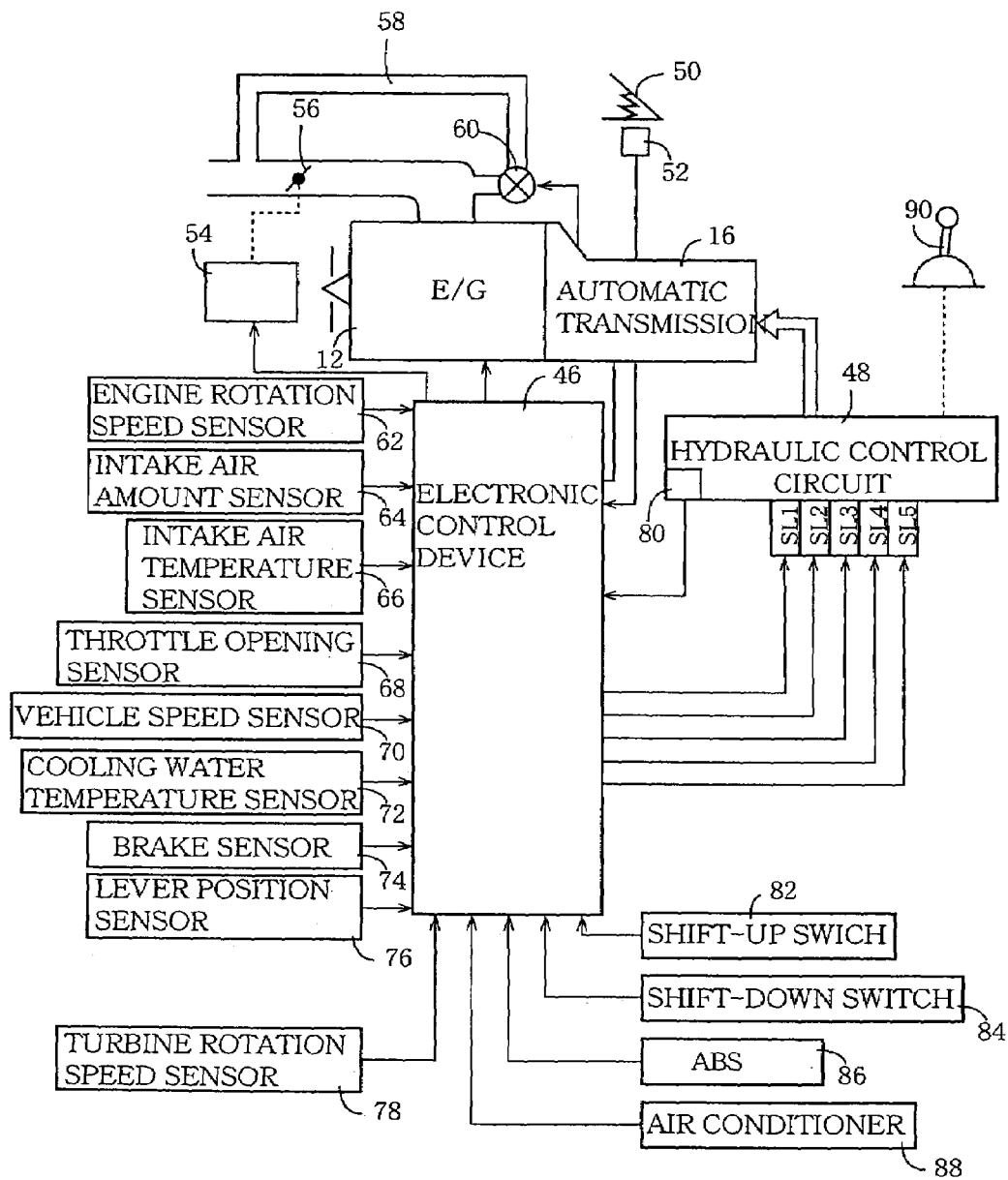
FIG. 3 is a diagrammatic view of an essential portion of an electric system of the transmission system, shown in FIG. 1.

FIG. 3 is a diagrammatic view of an electric system employed by the vehicle to control the engine 12, the automatic transmission 16, and other elements. The electric system includes an electronic control device 46, and the hydraulic control circuit 48. The electronic control device 46 is constituted by a so-called microcomputer including a CPU (central processing unit), a RAM (random access memory), a ROM (read only memory), and an input and output interface. The CPU processes signals according to control programs pre-stored by the ROM, while utilizing a temporary storage function of the RAM. The hydraulic control circuit 48 includes a first, a second, a third, a fourth, and a fifth solenoid operated valve SL1, SL2, SL3, SL4, SL5 each functioning as an electromagnetic valve device. The electronic control device 46 controls basic operations of the automatic transmission 16, such as a speed-step changing operation, via the hydraulic control circuit 48, i.e., by controlling the solenoid valves SL1 through SL5.

The electric system additionally includes an accelerator operation amount sensor 52 which detects an amount Acc of operation of an accelerator pedal 50 and supplies the detected accelerator operation amount Acc to the electronic control device 46. In an intake pipe of the engine 12, there is provided an electronic throttle valve 56 which is opened by a throttle actuator 54, by a throttle opening $\Theta_{TH}$ basically corresponding to the accelerator operation amount Acc. The electronic throttle valve 56 is bypassed by a bypass passage 58 so as to control an idling rotation speed $N_{EIDL}$ of the engine 12. In the bypass passage 58, there is provided an ISC (idling rotation speed control) valve 60 which controls an amount of air taken when the electronic throttle valve 56 is fully closed, so as to control the idling rotation speed $N_{EIDL}$ of the engine 12. The electric system further includes an engine rotation speed sensor 62 which detects a rotation speed $N_E$ of the engine 12; an intake air amount sensor 64 which detects an amount Q of air taken by the engine 12; an intake air temperature sensor 66 which detects a temperature $T_A$ of the air taken by the engine 12; a throttle sensor 68 which detects the throttle opening $\Theta_{TH}$ of the throttle valve 56; a vehicle speed sensor 70 which detects a running speed V of the vehicle; a cooling water temperature sensor 72 which detects a temperature $T_W$ of a cooling water to cool the engine 12; a brake switch 74 which detects whether a foot brake is being operated or not; a lever position sensor 76 which detects an operation position $P_{SH}$ of a shift lever 90; a turbine rotation speed sensor 78 which detects a turbine rotation speed $N_T$; an AT oil temperature sensor 80 which detects an AT oil temperature $T_{OIL}$ as a temperature of a hydraulic oil as the hydraulic fluid in the hydraulic control circuit 48; a shift-up switch 82 which is manually operable to input a shift-up command $R_{UP}$ to increase the speed step of the automatic transmission 16; and a shift-down switch 82 which is manually operable to input a shift-down command $R_{DN}$ to decrease the speed step of the automatic transmission 16. These sensors and switches 62, 64, 66, 68, 70, 72, 74, 76, 78, 80, 82, 84 supply, to the electronic control device 46, respective electric signals representing the engine rotation speed $N_E$, the intake air amount Q, the intake air temperature $T_A$, the throttle opening $\Theta_{TH}$, the vehicle running speed V, the engine cooling water temperature $T_W$, whether the foot brake is being operated or not, the operation position $P_{SH}$ of the shift lever 72, the turbine rotation speed $N_T$, the AT oil temperature $T_{OIL}$, the shift-up command $R_{UP}$, and the shift-down command $R_{DN}$. In addition, the electric system is connected to an ABS (i.e., an anti-lock brake system) 86 which controls a braking force so that the wheels of the vehicle may not be locked (i.e., slipped) upon operation of the foot brake, and is additionally connected to an air conditioner 88. The electronic control device 46 receives, from the ABS 86, information about, e.g. a braking hydraulic pressure corresponding to the braking force and, from the air conditioner 88, a signal representing whether the conditioner 88 is being operated or not.

The shift lever 90 is manually moved and switched by a driver, so that a manual valve, not shown, is switched and an operation state of the automatic transmission 16 is switched. For example, the shift lever 90 is selectively moved to one of four operation positions, i.e., "R (reverse) position", "N (neutral) position", "D (drive) position or range", and "P (parking) position". The R position is a backward running position; the N position is a driving force transmission stopping position; and the D position or range is a forward running position or range. In the R position, a reverse running circuit is mechanically established and the above-described reverse speed step "Rev" is established. In the N position, a neutral circuit is mechanically established and the frictional engagement elements that use a D-position pressure $P_D$ as a source hydraulic pressure, i.e., the first and second clutches C1, C2 and the first brake B1 are released or disengaged. In the D position or range, an appropriate one of the above-described first to sixth forward speed steps "$1^{st}$" through "$6^{th}$" is selectively established depending upon a running state of the vehicle.

Figure 4:
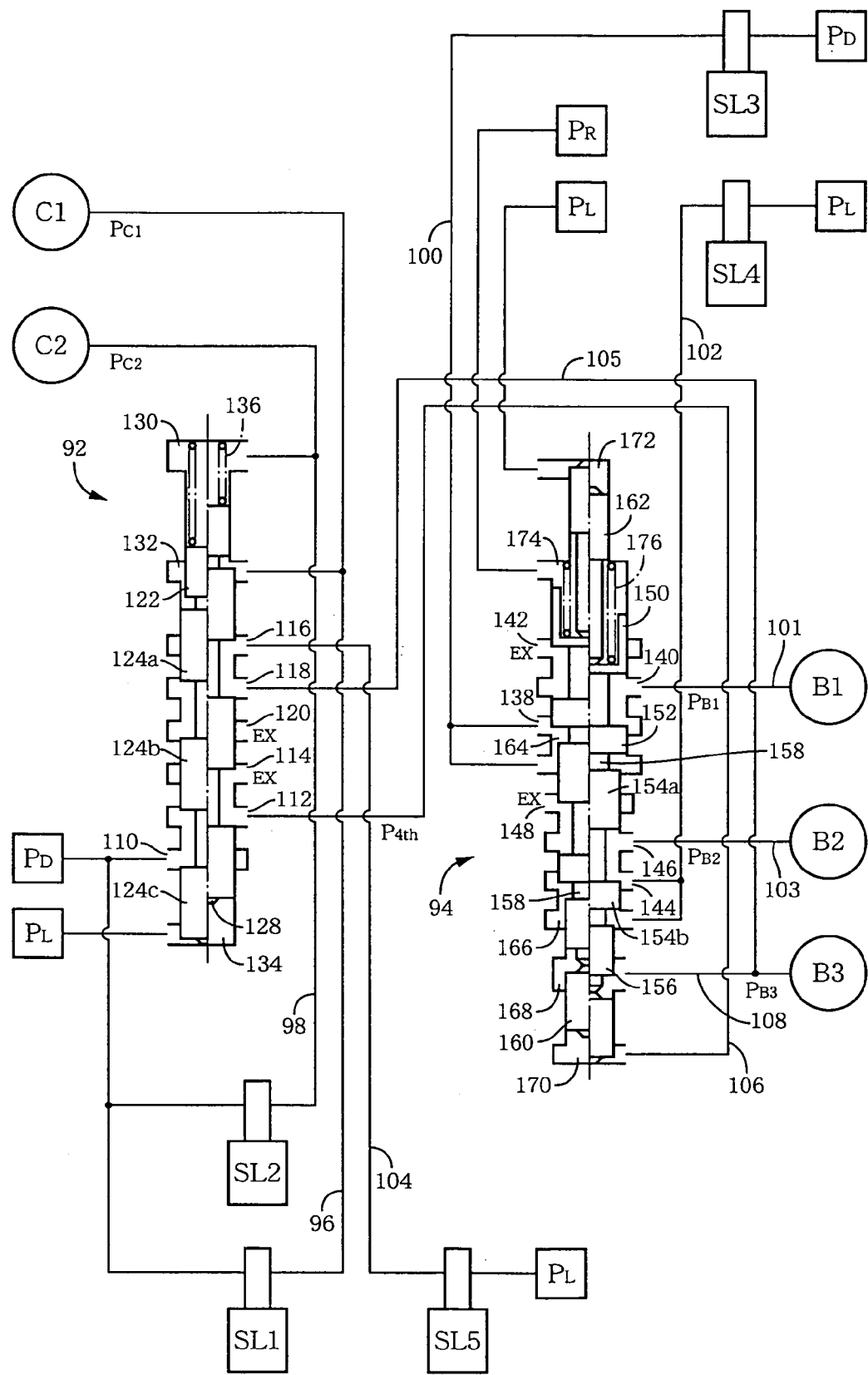
FIG. 4 is a diagrammatic view of a hydraulic control circuit as an essential portion of the hydraulic control apparatus of the transmission system, shown in FIG. 1.

FIG. 4 is a diagrammatic view of an essential portion of the hydraulic control circuit 48. The hydraulic control circuit 48 includes the first solenoid valve SL1 to control the first clutch C1; the second solenoid valve SL2 to control the second clutch C2; the third solenoid valve SL3 to control the first brake B1; the fourth solenoid valve SL4 to control the second brake B2; the fifth solenoid valve SL5 to control the third brake B3; a first control valve (i.e., a brake control valve) 92 which, when both the first hydraulic pressure $P_{C1}$ to operate the first clutch C1 and the second hydraulic pressure $P_{C2}$ to operate the second clutch C2 are supplied to the first control valve 92, drains the third brake B3 and additionally outputs the fourth-speed-step (i.e., the sixth) hydraulic pressure $P_{4th}$ as a control hydraulic pressure; and a second control valve (i.e., a clutch-apply control valve) 94 which, when at least two hydraulic pressures of the control hydraulic pressure (i.e., the sixth hydraulic pressure) $P_{4th}$, the third hydraulic pressure $P_{B1}$ to operate the first brake B1, the fourth hydraulic pressure $P_{B2}$ to operate the second brake B2, and the fifth hydraulic pressure $P_{B3}$ to operate the third brake B3 are supplied to the second control valve 94, drains the first and second brakes B1, B2.

Each of the first through fifth solenoid valves SL1 through SL5 is a linear solenoid valve which outputs an appropriate hydraulic pressure based on a drive electric current supplied thereto from the electronic control device 46. The first solenoid valve SL1 produces, based on the D-position pressure $P_D$, as a source hydraulic pressure, outputted from the manual valve, not shown, the first hydraulic pressure $P_{C1}$ to control directly the operation (i.e., engagement and disengagement) of the first clutch C1, and outputs the first hydraulic pressure $P_{C1}$ to a first hydraulic passage 96. The second solenoid valve SL2 produces, based on the D-position pressure $P_D$ as a source hydraulic pressure, the second hydraulic pressure $P_{C2}$ to control directly the operation of the second clutch C2, and outputs the second hydraulic pressure $P_{C2}$ to a second hydraulic passage 98. The third solenoid valve SL3 produces, based on the D-position pressure $P_D$ as a source hydraulic pressure, the third hydraulic pressure $P_{B1}$ to control directly the operation of the first brake B1, and outputs the third hydraulic pressure $P_{B1}$ to a third hydraulic passage 100. The fourth solenoid valve SL4 produces, based on a line hydraulic pressure $P_L$ as a source hydraulic pressure, the fourth hydraulic pressure $P_{B2}$ to control directly the operation of the second brake B2, and outputs the fourth hydraulic pressure $P_{B2}$ to a fourth hydraulic passage 102. The fifth solenoid valve SL5 produces, based on the line hydraulic pressure $P_L$ as a source hydraulic pressure, the fifth hydraulic pressure $P_{B3}$ to control directly the operation of the third brake B3, and outputs the fifth hydraulic pressure $P_{B3}$ to a fifth hydraulic passage 104.

The first hydraulic passage 96 supplies the first hydraulic pressure $P_{C1}$ outputted from the first solenoid valve SL1, to the first clutch C1 and the first control valve 92. The second hydraulic passage 98 supplies the second hydraulic pressure $P_{C2}$ outputted from the second solenoid valve SL2, to the second clutch C2 and the first control valve 92. The third hydraulic passage 100 supplies the third hydraulic pressure $P_{B1}$ outputted from the third solenoid valve SL3, to the first brake B1 via the second control valve 94 and a sixth hydraulic passage 101. The fourth hydraulic passage 102 supplies the fourth hydraulic pressure $P_{B2}$ outputted from the fourth solenoid valve SL4, to the second brake B2 via the second control valve 94 and a seventh hydraulic passage 103. The fifth hydraulic passage 104 supplies the fifth hydraulic pressure $P_{B3}$ outputted from the fifth solenoid valve SL5, to the first control valve 92, and the fifth hydraulic pressure $P_{B3}$ is further supplied to the third brake B3 via an eighth hydraulic passage 105. Simultaneously, a second signal-pressure hydraulic passage 108 as a branch of the eighth hydraulic passage 105 supplies the fifth hydraulic pressure $P_{B3}$ to a third hydraulic chamber 168 of the second control valve 94.

The first control valve 92 has a first input port 110 to which the D-position pressure $P_D$ is inputted; a first output port 112 which supplies, as the control hydraulic pressure, i.e., the fourth-speed-step hydraulic pressure (i.e., the sixth hydraulic pressure) $P_{4th}$, the D-position pressure $P_D$ inputted to the first input port 110, to a first signal-pressure hydraulic passage 106; a first drain port 114 which drains the fourth-speed-step hydraulic pressure $P_{4th}$ in the first signal-pressure hydraulic passage 106; a second input port 116 to which the fifth hydraulic pressure $P_{B3}$ outputted from the fifth solenoid valve SL5 is inputted; a second output port 118 which outputs the fifth hydraulic pressure $P_{B3}$ inputted to the second input port 116; a second drain port 120 which drains the third brake B3; a spool valve member 128 which has a first land 122 having a cross-section area $S_{P1}$, and three second lands 124a, 124b, 124c (hereinafter, referred to as the "second lands 124", where appropriate) each having a cross-section area $S_{P2}$ greater than the cross-section area $S_{P1}$, and which is movable between a drain position thereof (indicated by a left-hand half portion of the valve 92 shown in FIG. 4) in which the first input and output ports 110, 112 communicate with each other and the second output and drain ports 118, 120 communicate with each other, and a non-drain position thereof (indicated by a right-hand half portion of the valve 92 shown in FIG. 4) in which the second input and output ports 116, 118 communicate with each other and the first output and drain ports 112, 114 communicate with each other; a first hydraulic chamber 130 which receives the second hydraulic pressure $P_{C2}$ outputted from the second solenoid valve SL2, so that the second hydraulic pressure $P_{C2}$ acts on an end surface of the first land 122 and produces a thrust to move the spool valve member 128 toward its drain position; a second hydraulic chamber 132 which receives the first hydraulic pressure $P_{C1}$ outputted from the first solenoid valve SL1, so that the first hydraulic pressure $P_{C1}$ acts on a pressure receiving area corresponding to a difference between the respective cross-section areas $S_{P1}$, $S_{P2}$ of the first and second lands 122, 124, and produces a thrust to move the spool valve member 128 toward its drain position; a third hydraulic chamber 134 which receives the line hydraulic pressure $P_L$, so that the line hydraulic pressure $P_L$ acts on an end surface of the second land 122c and produces a thrust to move the spool valve member 128 toward its non-drain position; and a spring 136 which is accommodated in the first hydraulic chamber 130 and which biases the spool valve member 128 toward its drain position.

In a state of the vehicle in which at least one of the first and second hydraulic pressures $P_{C1}$, $P_{C2}$ is not inputted to the first control valve 92 and accordingly the following mathematical expression (1) is satisfied, i.e., the vehicle is normally running at one of the forward speed steps other than the fourth speed step "$4^{th}$", the spool valve member 128 is moved to the non-drain position, so that the fifth hydraulic pressure $P_{B3}$ outputted from the fifth solenoid valve SL5 is allowed to be supplied to the third brake B3 via the second input port 116 and the second output port 118, and is simultaneously allowed to be supplied to the third hydraulic chamber 168 of the second control valve 94 via the second signal-pressure hydraulic passage 108. On the other hand, in a state of the vehicle in which both of the first and second hydraulic pressures $P_{C1}$, $P_{C2}$ are inputted to the first control valve 92 and accordingly the following mathematical expression (2) is satisfied, i.e., the vehicle is normally running at the fourth speed step "$4^{th}$", the spool valve member 128 is moved to the drain position, so that the third brake B3 is drained and the fourth-speed-step pressure $P_{4th}$ is supplied to a fourth hydraulic chamber 170 of the second control valve 94 via the first signal-pressure hydraulic passage 106. In the expressions (1), (2), the biasing force of the spring 136 is represented by $F_{V1}$.

$$S_{P1} \times P_{C2} + (S_{P2} - S_{P1}) \times P_{C1} + F_{V1} < S_{P2} \times P_L \quad (1)$$

$$S_{P1} \times P_{C2} + (S_{P2} - S_{P1}) \times P_{C1} + F_{V1} > S_{P2} \times P_L \quad (2)$$

The second control valve 94 has a first input port 138 to which the third hydraulic pressure $P_{B1}$ outputted from the third solenoid valve SL3 is inputted; a first output port 140 which supplies the third hydraulic pressure $P_{B1}$ inputted to the first input port 138, to the first brake B1 via the sixth hydraulic passage 101; a first drain port 142 which drains the third hydraulic pressure $P_{B1}$ supplied to the first brake B1 via the sixth hydraulic passage 101; a second input port 144 to which the fourth hydraulic pressure $P_{B2}$ outputted from the fourth solenoid valve SL4 is inputted; a second output port 146 which supplies the fourth hydraulic pressure $P_{B2}$ inputted to the second input port 144, to the second brake B2 via the seventh hydraulic passage 103; a second drain port 148 which drains the fourth hydraulic pressure $P_{B2}$ supplied to the second brake B2 via the seventh hydraulic passage 103; a spool valve member 158 which has a zero-th land 150 and a first land 122 each having a cross-section area $S_{S1}$, two second lands 154a, 154b (hereinafter, referred to as the "second lands 154" where appropriate) each having a cross-section area $S_{S2}$ smaller than the cross-section area $S_{S1}$, and a third land 156 having a cross-section area $S_{S3}$ smaller than the cross-section area $S_{S2}$, and which is movable between a drain position thereof (indicated by a left-hand half portion of the valve 94 shown in FIG. 4) in which the first output and drain ports 140, 142 communicate with each other and the second output and drain ports 146, 148 communicate with each other, and a non-drain position thereof (indicated by a right-hand half portion of the valve 92 shown in FIG. 4) in which the first input and output ports 138, 140 communicate with each other and the second input and output ports 144, 146 communicate with each other; a first plunger 160 which is abuttable on an end portion of the spool valve member 158 that is located on the side of the third land 156 and which has the same cross-section area as that $S_{S3}$ of the third land 156; a second plunger 162 which is abuttable on an opposite end portion of the spool valve member 158 that is located on the side of the zero-th land 150 and which has the same, or a different, cross-section area as, or than, that $S_{S3}$ of the third land 156; a first hydraulic chamber 164 which receives the third hydraulic pressure $P_{B1}$ outputted from the third solenoid valve SL3, so that the third hydraulic pressure $P_{B1}$ acts on a pressure receiving area corresponding to a difference of the respective cross-section areas $S_{S1}$, $S_{S2}$ of the first and second lands 152, 154 and produces a thrust to move the spool valve member 158 toward its drain position; a second hydraulic chamber 166 which receives the fourth hydraulic pressure $P_{B2}$ outputted from the fourth solenoid valve SL4, so that the fourth hydraulic pressure $P_{B2}$ acts on a pressure receiving area corresponding to a difference of the respective cross-section areas $S_{S2}$, $S_{S3}$ of the second and third lands 154, 156 and produces a thrust to move the spool valve member 158 toward its drain position; the third hydraulic chamber 168 which receives the fifth hydraulic pressure $P_{B3}$ outputted from the fifth solenoid valve SL5, so that the fifth hydraulic pressure $P_{B3}$ acts on an end surface of the third land 156 and produces a thrust to move the spool valve member 158 toward its drain position; the fourth hydraulic chamber 170 which receives the sixth hydraulic pressure $P_{4th}$ outputted from the first output port 112 of the first control valve 92, so that the sixth hydraulic pressure $P_{4th}$ acts on an end surface of the first plunger 160 that is remote from the third land 156 and produces a thrust to move, via the first plunger 160, the spool valve member 158 toward its drain position; a fifth hydraulic chamber 172 which receives the line hydraulic pressure $P_L$, so that the line pressure $P_L$ acts on an end surface of the second plunger 162 that is remote from the zero-th land 150 and produces a thrust to move, via the second plunger 162, the spool valve member 158 toward its non-drain position; a sixth hydraulic chamber 174 which receives an R-position pressure $P_R$ outputted from the manual valve, not shown, so that the R-position pressure $P_R$ acts on an end surface of the zero-th land 150 and produces a thrust to move the spool valve member 158 toward its non-drain position; and a spring 176 which is accommodated in the sixth hydraulic chamber 174 and which biases the spool valve member 158 toward its non-drain position.

In a state of the vehicle in which two or more hydraulic pressures of the third, fourth, fifth, and sixth hydraulic pressures $P_{B1}$, $P_{B2}$, $P_{B3}$, $P_{4th}$ are not inputted to the second control valve 94 and accordingly the following mathematical expression (3) is satisfied, the spool valve member 158 is moved to the non-drain position by a biasing force of the spring 176, so that the third hydraulic pressure $P_{B1}$ outputted from the third solenoid valve SL3 is allowed to be supplied to the first brake B1 and simultaneously the fourth hydraulic pressure $P_{B2}$ outputted from the fourth solenoid valve SL4 is allowed to be supplied to the second brake B2. On the other hand, in a state of the vehicle in which two or more hydraulic pressures of the third, fourth, fifth, and sixth hydraulic pressures $P_{B1}$, $P_{B2}$, $P_{B3}$, $P_{4th}$ are inputted to the second control valve 94 and accordingly the following mathematical expression (4) is satisfied, the spool valve member 158 is moved to its drain position, so that the sixth hydraulic passage 101 and the first brake B1 are drained, and the seventh hydraulic passage 103 and the second brake B2 are drained. In the expressions (3), (4), the biasing force of the spring 176 is represented by $F_{V2}$, and the higher one of the fifth and sixth hydraulic pressures $P_{B3}$, $P_{4th}$ is represented by $max(P_{B3}, P_{4th})$.

$$(S_{S2}-S_{S1}) \times P_{B1} + (S_{S3}-S_{S2}) \times P_{B2} + S_{S3} \times max(P_{B3}, P_{4th})$$
$$< S_{S3} \times P_L + F_{V2} \qquad (3)$$

$$(S_{S2}-S_{S1}) \times P_{B1} + (S_{S3}-S_{S2}) \times P_{B2} + S_{S3} \times max(P_{B3}, P_{4th})$$
$$> S_{S3} \times P_L + F_{V2} \qquad (4)$$

In the driving force transmission system 10, if at least two brakes of the first, second, and third brakes B1, B2, B3 might be simultaneously engaged, or at least three elements of the first and second clutches C1, C2 and the first through third brakes B1, B2, B3 might be simultaneously engaged, while the vehicle is running forward, interlocking would occur. However, those phenomena can be prevented by the first and second control valves 92, 94. More specifically described, since the first control valve 92 is provided, only one of the sixth-speed-step pressure $P_{4th}$ indicative of the simultaneous presence of the first and second hydraulic pressures $P_{C1}$, $P_{C2}$, and the fifth hydraulic pressure $P_{B3}$ is allowed to be supplied to the second control valve 94; and since the second control valve 94 is provided, if at least two hydraulic pressures of the third, fourth, and fifth hydraulic pressures $P_{B1}$, $P_{B2}$, $P_{B3}$, and the fourth-speed-step hydraulic pressure $P_{4th}$ are supplied to the second control valve 94, the first and second brakes B1, B2 are both drained. Therefore, there are no possibilities that at least two brakes of the first, second, and third brakes B1, B2, B3 be simultaneously engaged, or that at least three elements of the first and second clutches C1, C2 and the first through third brakes B1, B2, B3 be simultaneously engaged. For example, there is no possibility that the first and second clutches C1, C2 and the third brake B3 be simultaneously engaged. Meanwhile, when the vehicle is running backward, the sixth hydraulic chamber 174 of the second control valve 94 receives the R-position pressure $P_R$, so that the R-position pressure $P_R$ acts on the end surface of the zero-th land 150 and produces the thrust to move the spool valve member 158 toward its non-drain position. Consequently the second and third brakes B2, B3 are simultaneously operated or engaged, and the reverse speed step "Rev" is established.

The first and second signal-pressure hydraulic passages 106, 108 are exclusively used to transmit the fourth-speed-step hydraulic pressure $P_{4th}$ and the fifth hydraulic pressure $P_{B3}$ each just functioning as a signal, to the fourth and third hydraulic chambers 170, 168 of the second control valve 94, respectively, and accordingly each of the hydraulic passages 106, 108 need not conduct a substantial amount of hydraulic fluid. Thus, a cross-section area of each of the hydraulic passages 106, 108 is smaller than those of the first hydraulic passage 96 to supply the hydraulic fluid to the first clutch C1, the second hydraulic passage 98 to supply the hydraulic fluid to the second clutch C2, the third hydraulic passage 100 and the sixth hydraulic passage 101 to supply the hydraulic fluid to the first brake B1, the fourth hydraulic passage 102 and the seventh hydraulic passage 103 to supply the hydraulic fluid to the second brake B2, and the fifth hydraulic passage 104 and the eighth hydraulic passage 105 to supply the hydraulic fluid to the third brake B3. This leads to reducing the size of the hydraulic control circuit 48.

As is apparent from the foregoing description of the preferred embodiment of the present invention, the hydraulic control circuit 48 as part of the hydraulic control apparatus includes the first control valve 92 which, when the first and second hydraulic pressures $P_{C1}$, $P_{C2}$ to operate the first and second clutches C1, C2 as the first and second frictional engagement elements are both supplied to the first control valve 92, drains the third brake B3 as the fifth frictional engagement element and outputs the sixth hydraulic pressure (i.e., the fourth-speed-step hydraulic pressure) $P_{4th}$ as the control hydraulic pressure; and the second control valve 94 which, when at least two hydraulic pressures of (a) the sixth hydraulic pressure $P_{4th}$ and (b) third, fourth, and fifth hydraulic pressures $P_{B1}$, $P_{B2}$, $P_{B3}$ to operate the first, second, and third brakes B1, B2, B3 as the third, fourth, and fifth frictional engagement elements are supplied to the second control valve 94, drains both the first and second brakes B1, B2. The first control valve 92 allows only one of the sixth hydraulic pressure $P_{4th}$ and the fifth hydraulic pressure $P_{B3}$ to be supplied to the second control valve 94. Therefore, the spool valve member 128 of the first control valve 92 has only to have, in its axial direction, a single step or difference; and the spool valve member 158 of the second control valve 94 has only to have, in its axial direction, two steps or diameter differences. Thus, the hydraulic control circuit 48 can drain, when the electronic control device 46 fails, one or more appropriate frictional engagement elements B1, B2, B3, and can enjoy the smallest possible size. In addition, each of the first, second, and third brakes B1, B2, B3 as the third, fourth, and fifth frictional engagement elements is supplied with an operating hydraulic pressure from a corresponding one of the three solenoid valves SL3, SL4, SL5 as the third, fourth, and fifth electromagnetic valve devices via a single fail-safe valve (i.e., the first or second control valve 92, 94) only. Thus, the total number of hydraulic passages can be decreased and accordingly the size of the hydraulic control circuit 48 can be reduced.

In addition, in the illustrated embodiment, the hydraulic control circuit 48 employs the first and second control valves 92, 94 each as the fail-safe valve having the smallest possible size. Therefore, the hydraulic control circuit 48 is free of such problems that the cost of machining of each control valve 92, 94 may be increased to obtain a sufficiently high degree of coaxiality thereof, that the ease of provision of each valve 92, 94 may be lowered by a comparatively great length thereof, and that each valve 92, 94 may malfunction because of, e.g., increase of resistance thereof to the movement of each valve 92, 94.

In addition, in the illustrated embodiment, the fourth-speed-step hydraulic pressure (i.e., the sixth hydraulic pressure) $P_{4th}$ as the control hydraulic pressure, and the fifth hydraulic pressure $P_{B3}$ to operate the third brake B3 as the fifth frictional engagement element are supplied to the fourth and third hydraulic chambers 170, 168 of the second control valve 94 via the first and second signal-pressure hydraulic passages 106, 108, respectively, each of which has a cross-section area smaller than a cross-section area of each of the first through eighth hydraulic passages 96, 98, 100, 101, 102, 103, 104, 105 each of which supplies the hydraulic fluid to a corresponding one of the first and second clutches C1, C2 and the first, second, and third brakes B1, B2, B3 as the first through fifth frictional engagement elements. Thus, the size of the hydraulic control circuit 48 can be further reduced.

The hydraulic control circuit 48 includes the first hydraulic passage 96 which supplies, from the first electromagnetic valve SL1, the first hydraulic pressure $P_{C1}$ to the first clutch C1 and the first control valve 92; the second hydraulic passage 98 which supplies, from the second electromagnetic valve SL2, the second hydraulic pressure $P_{C2}$ to the second clutch C2 and the first control valve 92; the third hydraulic passage 100 which supplies, from the third electromagnetic valve SL3, the third hydraulic pressure $P_{B1}$ to the first brake B1 via the second control valve 94; the fourth hydraulic passage 102 which supplies, from the fourth electromagnetic valve SL4, the fourth hydraulic pressure $P_{B2}$ to the second brake B2 via the second control valve 94; the fifth hydraulic passage 104 which supplies, from the fifth electromagnetic valve SL5, the fifth hydraulic pressure $P_{B3}$ to each of the third brake B3 and the second control valve 94 via the first control valve 92; the first signal-pressure hydraulic passage 106 which, when the first and second hydraulic pressures $P_{C1}$, $P_{C2}$ are inputted to the first control valve 92 and accordingly the first control valve 92 is switched to the above-described drain position to drain the eighth hydraulic passage 105, introduces, as the fourth-speed-step hydraulic pressure $P_{4th}$ or the control hydraulic pressure, the D-position pressure $P_D$ inputted to the first control valve 92, to the second control valve 94; and the second signal-pressure hydraulic passage 108 which supplies the fifth hydraulic pressure $P_{B3}$ to the second control valve 94. When at least two hydraulic pressures of the fourth-speed-step (the sixth) hydraulic pressure $P_{4th}$ and the third, fourth, and fifth hydraulic pressures $P_{B1}$, $P_{B2}$, $P_{B3}$ are inputted to the second control valve 94, the second control valve 94 is switched to the above-described drain position to drain the first and second brakes B1, B2 as the third and fourth frictional engagement elements and the sixth and seventh hydraulic passages 101, 103. This is a fail-safe function of the hydraulic control circuit 48, which therefore can find its economic applications.

The second control valve 94 includes the spool valve member 158 which has the first, second, and third lands 152, 154, 156 having the first, second, and third diameters, respectively, that differ from each other (i.e., decreases) in the order of description, and which is movable between the drain position at which the spool valve member 158 drains the first and second brakes B1, B2 and the non-drain position at which the spool valve member 158 does not drain the first or second brake B1, B2; the first plunger 160 which is abuttable on an end portion of the spool valve member 158 that is located on the side of the third land 156, and which has the same diameter as the third diameter of the third land 156; the first hydraulic chamber 164 which receives the third hydraulic pressure $P_{B1}$ to operate the first brake B1, so that the third hydraulic pressure $P_{B1}$ acts on a pressure receiving area corresponding to a difference of the first and second diameters of the first and second lands 152, 154 and thereby produces a thrust to move the spool valve member 158 toward the drain position; the second hydraulic chamber 166 which receives the fourth hydraulic pressure $P_{B2}$ to operate the second brake B2, so that the fourth hydraulic pressure $P_{B2}$ acts on a pressure receiving area corresponding to a difference of the second and third diameters of the second and third lands 154, 156 and thereby produces a thrust to move the spool valve member 158 toward the drain position; the third hydraulic chamber 168 which receives the fifth hydraulic pressure $P_{B3}$ to operate the third brake B3, so that the fifth hydraulic pressure $P_{B3}$ acts on a surface of an axial end of the third land 156 and thereby produces a thrust to move the spool valve member 158 toward the drain position; and the fourth hydraulic chamber 170 which receives the sixth hydraulic pressure $P_{4th}$ supplied from the first control valve 92, so that the sixth hydraulic pressure $P_{4th}$ acts on a surface of one of axially opposite ends of the first plunger 160 that is remoter than the other end thereof from the third land 156 and thereby produces a thrust to move the spool valve member 158 toward the drain position. Thus, the hydraulic control circuit 48 employs, as a fail-safe valve, the second control valve 94 having a simple construction and accordingly can find its economic applications.

In addition, in the hydraulic control circuit 48, the first and second control valves 92, 94 each as a fail-safe valve are provided at respective positions remoter from the hydraulic pump 30 as the hydraulic pressure source than respective positions where the third through fifth solenoid valves SL3 through SL5 as the third through fifth electromagnetic valve devices used to change the speed steps are provided. Therefore, after the fail-safe valves 92, 94 are switched, the frictional engagement elements B1, B2, B3 are freed of respective residual hydraulic pressures. Thus, interlocking can be prevented with reliability.

Next, there will be described another embodiment of the present invention that also relates to a hydraulic control apparatus. The present hydraulic control apparatus includes a hydraulic control circuit 48, shown in FIG. 5, that may be employed in place of the hydraulic control circuit 48 shown in FIGS. 3 and 4. The same reference numerals as used in the first embodiment shown in FIG. 4 are used to designate the corresponding elements of the second embodiment shown in FIG. 5, and the description of those elements are omitted from the following description of the second embodiment.

Figure 5:
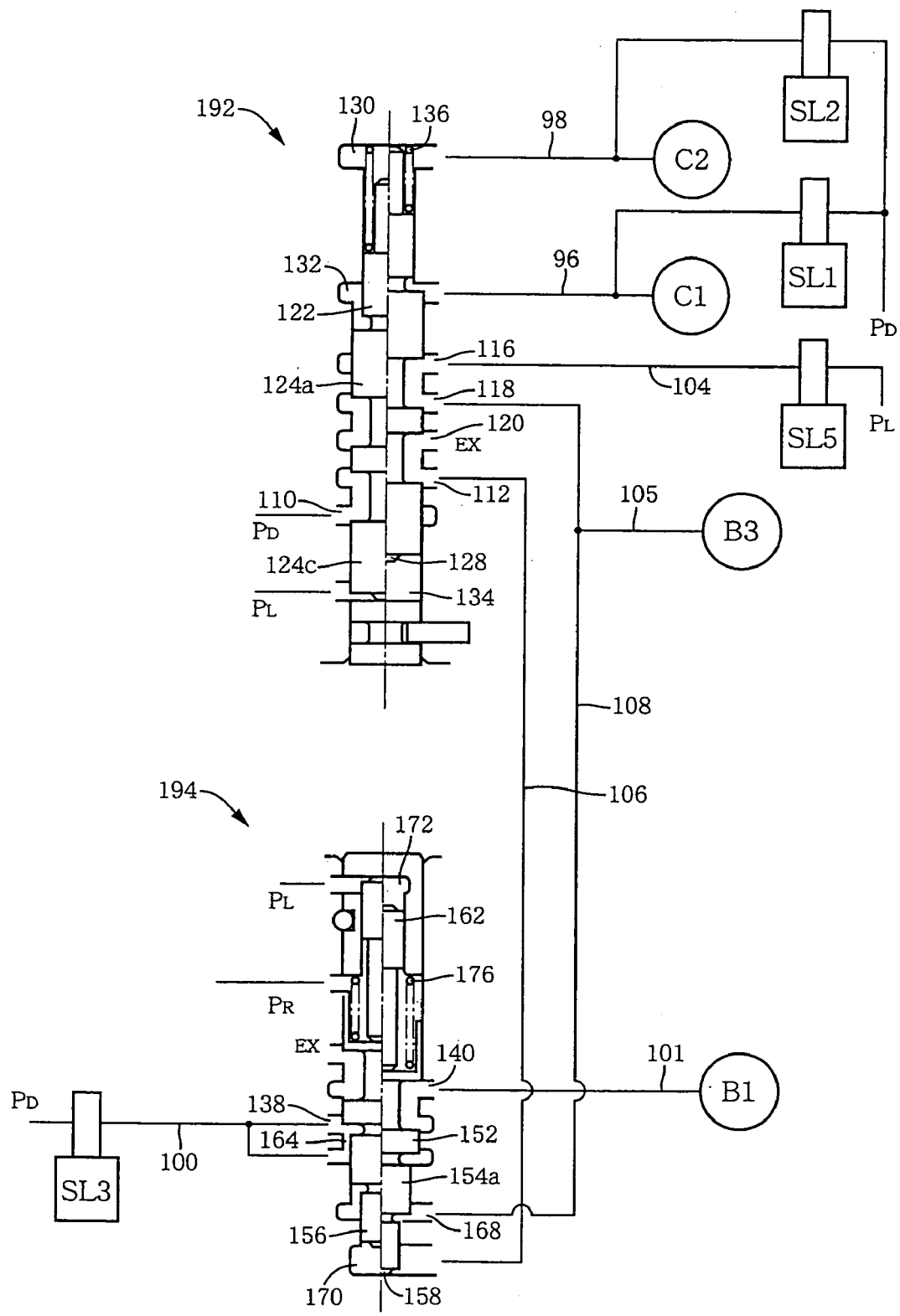
FIG. 5 is a diagrammatic view corresponding to FIG. 4, showing another hydraulic control circuit as an essential portion of another embodiment of the present invention that may be employed, by the transmission system of FIG. 1, in place of the hydraulic control circuit of FIG. 4, and include a first and a second control valve.

The hydraulic control circuit 48 shown in FIG. 5 includes a first control valve 192 and a second control valve 194, and differs from the hydraulic control circuit 48 shown in FIG. 4 in that the second control valve 194 does not include any portions for draining the fourth hydraulic pressure $P_{B2}$ supplied to the second brake B2 as the fourth frictional engagement element. In the automatic transmission 16 shown in FIGS. 1 and 2, the first speed step is established by operating the first clutch C1 and the second brake B2. However, if the one-way clutch F is operated, the second brake B2 need not be operated. Therefore, the hydraulic control circuit 48 shown in FIG. 5 is applicable to such an automatic transmission 16 which has six forward speed steps and whose first speed step is established without operating the second brake B2, and an automatic transmission which has five forward speed steps and does not have a speed step corresponding to the above-indicated first speed step.

The following description will be focused on differences between the first and second control valves 92, 94 shown in FIG. 4 and the first and second control valves 192, 194 shown in FIG. 5. In FIG. 5, the first control valve 192 differs from the first control valve 92 in that the first control valve 192 does not have the first drain port 114, or one 124b of the two second lands 124a, 124b, of the first control valve 92, but is identical with the first control valve 92 with respect to the other portions. Therefore, the first control valve 192 has the same switching function as that of the first control valve 92, i.e., allows only one of the fifth hydraulic pressure $P_{B3}$, and the fourth-speed-step (i.e., the sixth) hydraulic pressure $P_{4th}$ indicating that the first and second hydraulic pressures $P_{C1}$, $P_{C2}$ are both produced, to be supplied to the second control valve 194.

The second control valve 194 shown in FIG. 5 differs from the second control valve 94 in that the second control valve 194 does not have any portions for selectively supplying the fourth hydraulic pressure $P_{B2}$ to the second brake B2, or draining the fourth hydraulic pressure $P_{B2}$ (or the fourth hydraulic passage 102 and the seventh hydraulic passage 103), that is, does not have the second input port 144, the second output port 146, the second drain port 148, one 154b of the two second lands 154a, 154b, the second hydraulic chamber 166, or the first plunger 160, and one end surface of the third land 156 is exposed in the fourth hydraulic chamber 170, but is identical with the second control valve 94 with respect to the other portions. Therefore, when at least two hydraulic pressures of the third and fifth hydraulic pressures $P_{B1}$, $P_{B3}$ and the fourth-speed-step (i.e., the sixth) hydraulic pressure $P_{4th}$ are inputted to the second control function 194, the spool valve member 158 is switched to its drain position, so that the sixth hydraulic passage 101 and the first brake B1 are drained. Thus, the second control valve 194 functions as a fail-safe valve.

The hydraulic control apparatus 48 shown in FIG. 5 includes the first control valve 192 which, when the first and second hydraulic pressures $P_{C1}$, $P_{C2}$ to operate the first and second clutches C1, C2 as the first and second frictional engagement elements are both supplied to the first control valve 192, drains the third brake B3 as the fifth frictional engagement element and outputs the fourth-speed-step (i.e., the sixth) hydraulic pressure $P_{4th}$ as the control hydraulic pressure; and the second control valve 194 which, when at least two hydraulic pressures of (a) the fourth-speed-step (i.e., the sixth) hydraulic pressure $P_{4th}$ and (b) the third and fifth hydraulic pressures $P_{B1}$, $P_{B3}$ to operate the first and third brakes B1, B3 as the third and fifth frictional engagement elements are supplied to the second control valve 194, drains the first brake B1. Thus, the hydraulic control circuit 48 shown in FIG. 5 enjoys the same advantages as those of the hydraulic control circuit 48 shown in FIG. 4, with respect to the second through sixth speed steps of the automatic transmission 16. More specifically described, the first control valve 192 allows only one of the fourth-speed-step (the sixth) hydraulic pressure $P_{4th}$ and the fifth hydraulic pressure $P_{B3}$ to be supplied to the second control valve 194. Therefore, the spool valve member 128 of the first control valve 192 has only to have, in its axial direction, a single step or diameter difference; and the spool valve member 158 of the second control valve 94 has only to have, in its axial direction, two steps or diameter differences. Thus, the hydraulic control circuit 48 shown in FIG. 5 can drain, when the electronic control device 46 fails, an appropriate frictional engagement elements B1, B3, and can enjoy the smallest possible size.

Figure 6:
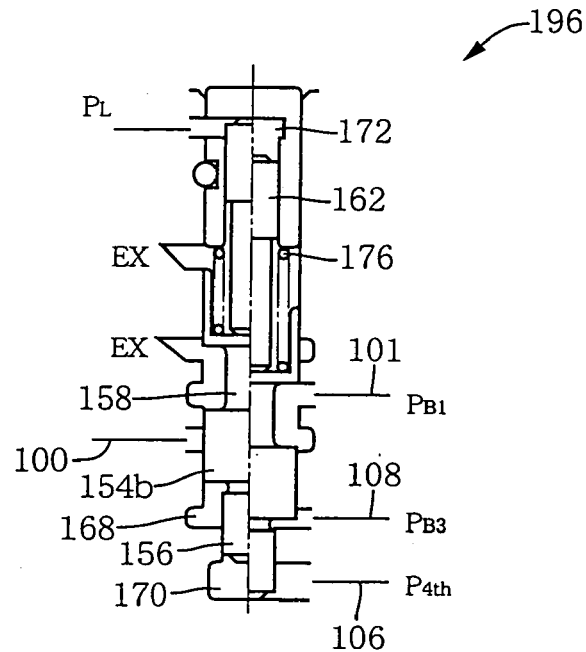
FIG. 6 is a view of another second control valve as an essential portion of another embodiment of the present invention that may be employed, by the hydraulic control circuit of FIG. 5, in place of the second control valve thereof.

FIG. 6 shows another embodiment of the present invention that relates to a second control valve 196 which may be employed in place of the second control valve 194 by the hydraulic control circuit 48 shown in FIG. 5. The second control valve 196 shown in FIG. 6 differs from the second control valve 194 shown in FIG. 5 in that the second control valve 196 does not have the first hydraulic chamber 164 which receives the third hydraulic pressure $P_{B1}$ so as to produce the thrust to move the spool valve member 158 toward its drain position (indicated by the left-hand half portion of the valve 194 shown in FIG. 6), or the first land 152 of the spool valve member 158 that defines the pressure receiving area to receive the third hydraulic pressure $P_{B1}$ in the first hydraulic chamber 164, that is, does not have one of the two steps or diameter differences of the spool valve member 158, and in that the biasing force of the spring 176 is so pre-set that when one of the fifth hydraulic pressure $P_{B3}$ and the fourth-speed-step (the sixth) hydraulic pressure $P_{4th}$ acts on the spool valve member 158, the spool valve member 158 is moved from its non-drain position to its drain position. However, the second control valve 196 is identical with the second control valve 194 with respect to the other portions.

Thus, in the embodiment shown in FIG. 6, when one of the fifth hydraulic pressure $P_{B3}$ and the fourth-speed-step (the sixth) hydraulic pressure $P_{4th}$ is supplied to the second control valve 196, the second control valve 196 drains the first brake B1. As described above, if the hydraulic control circuit 48 shown in FIG. 5 is normal with respect to the second through sixth speed steps shown in FIG. 2, the first and third brakes B1, B3 should not be simultaneously operated and, when the fourth-speed-step (the sixth) hydraulic pressure $P_{4th}$ is produced, neither the first nor third brake B1, B3 should be operated. Since the second control valve 196 drains, when either one of the fifth hydraulic pressure $P_{B3}$ and the fourth-speed-step (the sixth) hydraulic pressure $P_{4th}$ is supplied thereto, the first brake B1 that should not be used at that timing, the automatic transmission 16 can normally change its speed steps even if such a fail occurs that at that timing the third hydraulic pressure $P_{B1}$ is so produced as to be supplied to the first brake B1. Thus, the second control valve 196 has a fail-safe function, like a conventional shift valve.

Figure 7:
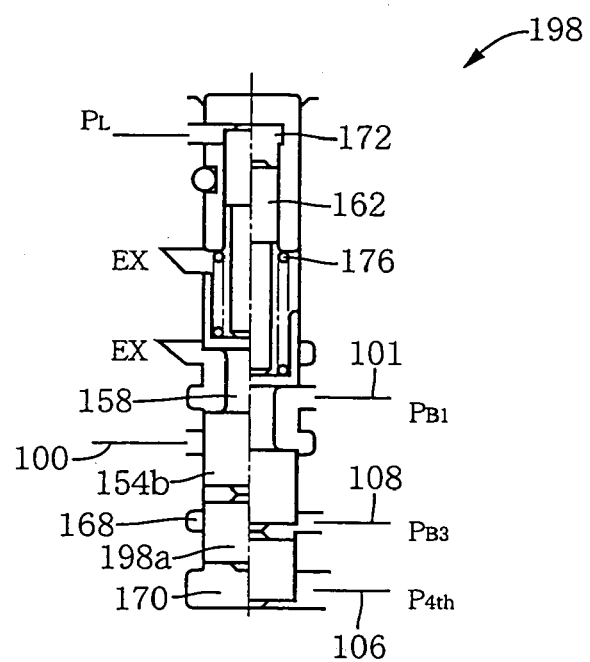
FIG. 7 is a view of another second control valve as an essential portion of another embodiment of the present invention that may be employed, by the hydraulic control circuit of FIG. 5, in place of the second control valve thereof.

FIG. 7 shows another embodiment of the present invention that relates to a second control valve 198 which may be employed in place of the second control valve 194 by the hydraulic control circuit 48 shown in FIG. 5. The second control valve 198 shown in FIG. 7 differs from the second control valve 196 shown in FIG. 6 in that the spool valve member 158 of the second control valve 198 does not have the third land 156, but the second control valve 198 employs a plunger 198a which is separate from the spool valve member 158 and has the same diameter as that of the second land 154b of the spool valve member 158. However, the second control valve 198 is identical with the second control valve 196 with respect to the other portions. The second control valve 198 shown in FIG. 7 has the same function as that of the second control valve 196 shown in FIG. 6.

Figure 8:
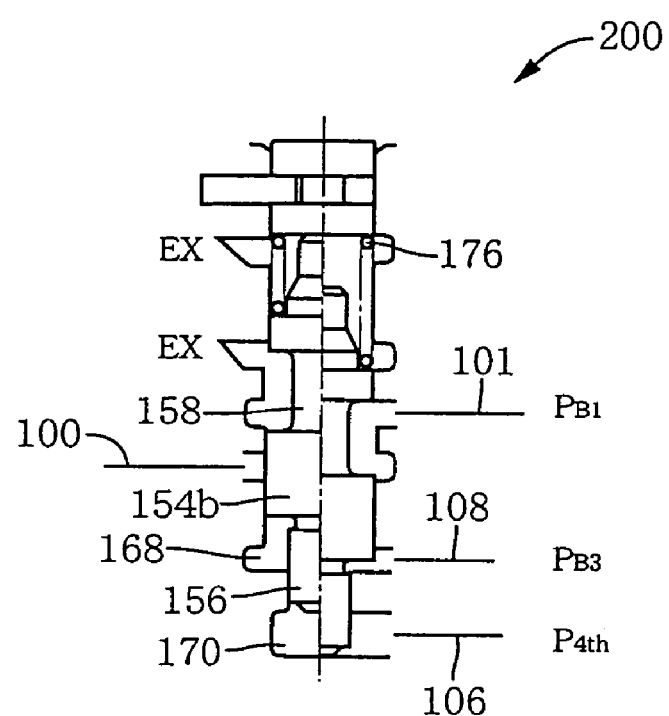
FIG. 8 is a view of another second control valve as an essential portion of another embodiment of the present invention that may be employed, by the hydraulic control circuit of FIG. 5, in place of the second control valve thereof.

FIG. 8 shows another embodiment of the present invention that relates to a second control valve 200 which may be employed in place of the second control valve 194 by the hydraulic control circuit 48 shown in FIG. 5. The second control valve 200 shown in FIG. 8 differs from the second control valve 196 shown in FIG. 6 in that the second control valve 200 does not have the plunger 162 abuttable on the spool valve member 158, or the hydraulic chamber 172 which receives the line hydraulic pressure PL, but is identical with the second control valve 196 with respect to the other portions. The second control valve 200 shown in FIG. 8 has the same function as that of the second control valve 196 shown in FIG. 6.

While the present invention has been described in its preferred embodiments by reference to the drawings, it is to be understood that the present invention may otherwise be embodied.

For example, in each of the illustrated embodiments shown in FIGS. 4, 5, 6, 7, and 8, the third hydraulic pressure $P_{B1}$ to operate the first brake B1 as the third frictional engagement element and the fifth hydraulic pressure $P_{B3}$ to operate the third brake B3 as the fifth frictional engagement element may be replaced with each other. In this case, for example, in the embodiment shown in FIG. 6, when the first and second hydraulic pressures $P_{C1}, P_{C2}$ are both supplied to the second and first hydraulic chambers 132, 130 of the first control valve 192, respectively, the first control valve 192 is switched to output the sixth (i.e., the fourth-speed-step) hydraulic pressure $P_{4th}$ to the second control valve 194, and drain the third hydraulic pressure $P_{B1}$ from the first brake B1; and, when the spool valve member 158 of the second control valve 196 is moved to its drain position, the second control valve 196 drains the fifth hydraulic pressure $P_{B3}$ from the third brake B3.

In addition, in each of the illustrated embodiments, each of the first through fifth solenoid valves SL1 through SL5 is provided by a single linear solenoid valve including a solenoid and a spool valve member that outputs a hydraulic pressure corresponding to a thrust outputted by the solenoid. However, each solenoid valve SL1–SL5 may be replaced with a complex valve device including a small-size solenoid valve that outputs a pilot pressure, and a pressure control valve that controls an output pressure so as to correspond to the pilot pressure.

The first embodiment, shown in FIGS. 1 through 4, relates to the automatic transmission 16 having the sixth forward speed steps wherein the first clutch C1 and the second brake B2 are operated to establish the first speed step; and the other embodiments, shown in FIGS. 5 through 8, relate to the automatic transmission 16 having the sixth forward speed steps wherein the first clutch C1 and the one-way clutch F are operated to establish the first speed step. However, the present invention is also applicable to an automatic transmission having four, five, six, or more forward speed steps, so long as two frictional engagement elements are selected from a plurality of frictional engagement elements, and operated, so as to establish each one of all those speed steps, or each one of a portion of the same.

In each of the illustrated embodiments, the first and second clutches C1, C2 and the first, second, and third brakes B1, B2, B3 provide the first, second, third, fourth, and fifth frictional engagement elements, respectively. However, this relationship may be modified. For example, the second clutch C2 may provide the first frictional engagement element. In addition, each of the first to fifth frictional engagement elements may be provided by a wet or dry multiple-disc clutch, a single-disc clutch, a multiple-disc brake, a single-disc brake, or a band type brake, or other sorts of elements each of which can be used to switch an operation of a hydraulically operated mechanical apparatus.

In each of the embodiments shown in FIGS. 4 and 5, the first and second hydraulic chambers 130, 132 of the first control valve 92, 192 receives the second and first hydraulic pressures $P_{C2}, P_{C1}$, respectively; and the first through fourth hydraulic chambers 164, 166, 168, 170 of the second control valve 94, 194 receives the third through sixth hydraulic pressures $P_{B1}, P_{B2}, P_{B3}, P_{4th}$, respectively. However, these relationships may be modified, as needed, depending upon a specific construction of the hydraulic control apparatus.

In addition, in each of the illustrated embodiments, each of the first through fifth solenoid valves SL1 through SL5 is provided by a linear solenoid valve which produces an appropriate hydraulic pressure corresponding to a drive electric current supplied thereto from the electronic control device 46. However, the linear solenoid valves may be replaced with various sorts of electromagnetic valve devices such as a duty solenoid valve.

In each of the illustrated embodiments, the hydraulic control circuit 48 has the fail-safe function that relates to the switching or changing of speed steps of the vehicle's automatic transmission 16. However, the present invention is preferably used to switch an operation of each of various sorts of industrial, hydraulically operated mechanical apparatuses.

It is to be understood that the present invention may be embodied with various other changes, modifications, and improvements that may occur to a person skilled in the art, in the light of technical teachings of the present invention.

What is claimed is:

1. A hydraulic control apparatus for switching an operation of a hydraulically operated mechanical apparatus, by selectively operating two frictional engagement elements of a first, a second, a third, and a fifth frictional engagement elements, the hydraulic control apparatus comprising:
   a first control valve which, in association with an event that respective hydraulic pressures to operate the first and second frictional engagement elements are both produced, drains one of the third and fifth frictional engagement elements and outputs a control hydraulic pressure; and
   a second control valve which, when at least two hydraulic pressures of (a) the control hydraulic pressure and (b) respective hydraulic pressures to operate the third and fifth frictional engagement elements are supplied to the second control valve, drains an other of the third and fifth frictional engagement elements.

2. The hydraulic control apparatus according to claim 1, for switching the operation of the hydraulically operated mechanical apparatus, by selectively operating two frictional engagement elements of the first, the second, the third, a fourth, and the fifth frictional engagement elements,
   wherein the first control valve drains, in association with an event that the respective hydraulic pressures to operate the first and second frictional engagement elements are both supplied to the first control valve, said one of the third and fifth frictional engagement elements and outputs the control hydraulic pressure, and
   wherein the second control valve drains, when at least two hydraulic pressures of (a) the control hydraulic pressure and (b) respective hydraulic pressures to operate the third, fourth, and fifth frictional engagement elements are supplied to the second control valve, said other of the third and fifth frictional engagement elements, and the fourth frictional engagement element.

3. The hydraulic control apparatus according to claim 2, further comprising:
   a first, a second, a third, a fourth, and a fifth electromagnetic valve device;
   a first hydraulic passage which supplies, from the first electromagnetic valve device, a first hydraulic pressure to the first frictional engagement element and the first control valve;
   a second hydraulic passage which supplies, from the second electromagnetic valve device, a second hydraulic pressure to the second frictional engagement element and the first control valve;
   a third hydraulic passage which supplies, from the third electromagnetic valve device, a third hydraulic pressure to the third frictional engagement element via the second control valve;
   a fourth hydraulic passage which supplies, from the fourth electromagnetic valve device, a fourth hydraulic pressure to the fourth frictional engagement element via the second control valve;
   a fifth hydraulic passage which supplies, from the fifth electromagnetic valve device, a fifth hydraulic pressure to the fifth frictional engagement element via the first control valve;
   a first signal-pressure hydraulic passage which has a cross-section area smaller than a cross-section area of each of the first, second, third, fourth, and fifth hydraulic passages and which, when the first and second hydraulic pressures are inputted to the first control valve and accordingly the first control valve is switched to drain the fifth frictional engagement element, introduces the control hydraulic pressure outputted from the first control valve, to the second control valve; and
   a second signal-pressure hydraulic passage which has a cross-section area smaller than the cross-section area of said each of the first, second, third, fourth, and fifth hydraulic passages and which supplies the fifth hydraulic pressure to the second control valve,
   wherein when at least two hydraulic pressures of the control hydraulic pressure and the third, fourth, and fifth hydraulic pressures are inputted to the second control valve, the second control valve is switched to drain the third and fourth frictional engagement elements.

4. The hydraulic control apparatus according to claim 3, wherein the second control valve comprises:
   a spool valve member which has a first, a second, and a third land having a first, a second, and a third diameter, respectively, that differ from each other in an order of description, and which is movable between a drain position at which the spool valve member drains the third and fourth frictional engagement elements and a non-drain position at which the spool valve member does not drain the third and fourth frictional engagement elements;
   a plunger which is abuttable on an end portion of the spool valve member that is located on a side of the third land thereof, and which has a same diameter as the third diameter of the third land;
   a first hydraulic chamber which receives the third hydraulic pressure to operate the third frictional engagement element, so that the third hydraulic pressure acts on a pressure receiving area corresponding to a difference of the first and second diameters of the first and second lands and thereby produces a thrust to move the spool valve member toward the drain position;
   a second hydraulic chamber which receives the fourth hydraulic pressure to operate the fourth frictional engagement element, so that the fourth hydraulic pressure acts on a pressure receiving area corresponding to a difference of the second and third diameters of the second and third lands and thereby produces a thrust to move the spool valve member toward the drain position;
   a third hydraulic chamber which receives the fifth hydraulic pressure to operate the fifth frictional engagement element, so that the fifth hydraulic pressure acts on a surface of an axial end of the third land and thereby produces a thrust to move the spool valve member toward the drain position; and
   a fourth hydraulic chamber which receives the control hydraulic pressure, so that the control hydraulic pressure acts on a surface of one of axially opposite ends of the plunger that is remoter than an other end thereof from the third land and thereby produces a thrust to move the spool valve member toward the drain position.

5. The hydraulic control apparatus according to claim 2, wherein the hydraulically operated mechanical apparatus comprises an automatic transmission of a vehicle that additionally includes a one-way clutch, and wherein the first frictional engagement element, and one of the fourth frictional engagement element and the one-way clutch are both operated to establish a first speed step of the automatic transmission; the first and third frictional engagement elements are both operated to establish a second speed step of the automatic transmission; the first and fifth frictional engagement elements are both operated to establish a third speed step of the automatic transmission; the first and second frictional engagement elements are both operated to establish a fourth speed step of the automatic transmission; the second and fifth frictional engagement elements are both operated to establish a fifth speed step of the automatic transmission; and the second and third frictional engagement elements are both operated to establish a sixth speed step of the automatic transmission.

6. The hydraulic control apparatus according to claim 1, further comprising:
   four hydraulic passages each of which supplies a hydraulic fluid to a corresponding one of the first, second, third, and fifth frictional engagement elements; and
   two signal-pressure hydraulic passages which supply the control hydraulic pressure, and the hydraulic pressure to operate the fifth frictional engagement element, respectively, to the second control valve, and each of which has a cross-section area smaller than a cross-section area of said each of the four hydraulic passages.

7. The hydraulic control apparatus according to claim 1, further comprising:
   a first, a second, a third, and a fifth electromagnetic valve device;
   a first hydraulic passage which supplies, from the first electromagnetic valve device, a first hydraulic pressure to the first frictional engagement element and the first control valve;
   a second hydraulic passage which supplies, from the second electromagnetic valve device, a second hydraulic pressure to the second frictional engagement element and the first control valve;
   a third hydraulic passage which supplies, from the third electromagnetic valve device, a third hydraulic pressure to the third frictional engagement element via the second control valve;
   a fifth hydraulic passage which supplies, from the fifth electromagnetic valve device, a fifth hydraulic pressure to the fifth frictional engagement element via the first control valve;
   a first signal-pressure hydraulic passage which has a cross-section area smaller than a cross-section area of each of the first, second, third, and fifth hydraulic passages and which, when the first and second hydraulic pressures are inputted to the first control valve and accordingly the first control valve is switched to drain the fifth frictional engagement element, introduces the control hydraulic pressure outputted from the first control valve, to the second control valve; and
   a second signal-pressure hydraulic passage which has a cross-section area smaller than the cross-section area of said each of the first, second, third, and fifth hydraulic passages and which supplies the fifth hydraulic pressure to the second control valve,
   wherein when at least two hydraulic pressures of the control hydraulic pressure and the third and fifth hydraulic pressures are inputted to the second control valve, the second control valve is switched to drain the third frictional engagement element.

8. The hydraulic control apparatus according to claim 7, wherein the second control valve comprises:
   a spool valve member which has a first, a second, and a third land having a first, a second, and a third diameter, respectively, that differ from each other in an order of description, and which is movable between a drain position at which the spool valve member drains the third frictional engagement element and a non-drain position at which the spool valve member does not drain the third frictional engagement element;
   a first hydraulic chamber which receives the third hydraulic pressure to operate the third frictional engagement element, so that the third hydraulic pressure acts on a pressure receiving area corresponding to a difference of the first and second diameters of the first and second lands and thereby produces a thrust to move the spool valve member toward the drain position;
   a third hydraulic chamber which receives the fifth hydraulic pressure to operate the fifth frictional engagement element, so that the fifth hydraulic pressure acts on a surface of an axial end of the third land and thereby produces a thrust to move the spool valve member toward the drain position; and
   a fourth hydraulic chamber which receives the control hydraulic pressure, so that the control hydraulic pressure acts on a surface of an axial end of the spool valve member and thereby produces a thrust to move the spool valve member toward the drain position.

9. The hydraulic control apparatus according to claim 1, wherein the first and third frictional engagement elements are both operated to establish a second operating state of the hydraulically operated mechanical apparatus; the first and fifth frictional engagement elements are both operated to establish a third operating state of the hydraulically operated mechanical apparatus; the first and second frictional engagement elements are both operated to establish a fourth operating state of the hydraulically operated mechanical apparatus; the second and fifth frictional engagement elements are both operated to establish a fifth operating state of the hydraulically operated mechanical apparatus; and the second and third frictional engagement elements are both operated to establish a sixth operating state of the hydraulically operated mechanical apparatus.

10. A hydraulic control apparatus for switching an operation of a hydraulically operated mechanical apparatus, by selectively operating two frictional engagement elements of a first, a second, a third, and a fifth frictional engagement elements, the hydraulic control apparatus comprising:
    a first control valve which, in association with an event that respective hydraulic pressures to operate the first and second frictional engagement elements are both produced, drains one of the third and fifth frictional engagement elements and outputs a control hydraulic pressure; and
    a second control valve which, when one of (a) the control hydraulic pressure and (b) one of respective hydraulic pressures to operate the third and fifth frictional engagement elements are supplied to the second control valve, drains an other of the third and fifth frictional engagement elements.

11. The hydraulic control apparatus according to claim 10, further comprising:
    a first, a second, a third, and a fifth electromagnetic valve device;
    a first hydraulic passage which supplies, from the first electromagnetic valve device, a first hydraulic pressure to the first frictional engagement element and the first control valve;
    a second hydraulic passage which supplies, from the second electromagnetic valve device, a second hydraulic pressure to the second frictional engagement element and the first control valve;

a third hydraulic passage which supplies, from the third electromagnetic valve device, a third hydraulic pressure to the third frictional engagement element via the second control valve;

a fifth hydraulic passage which supplies, from the fifth electromagnetic valve device, a fifth hydraulic pressure to the fifth frictional engagement element via the first control valve;

a first signal-pressure hydraulic passage which has a cross-section area smaller than a cross-section area of each of the first, second, third, and fifth hydraulic passages and which, when the first and second hydraulic pressures are inputted to the first control valve and accordingly the first control valve is switched to drain one of the third and fifth frictional engagement element, introduces the control hydraulic pressure outputted from the first control valve, to the second control valve; and a second signal-pressure hydraulic passage which has a cross-section area smaller than the cross-section area of said each of the first, second, third, and fifth hydraulic passages and which supplies one of the third and fifth hydraulic pressures to the second control valve, wherein when one of (a) the control hydraulic pressure and (b) said one of the third and fifth hydraulic pressures are inputted to the second control valve, the second control valve is switched to drain said other of the third and fifth frictional engagement elements.

12. The hydraulic control apparatus according to claim 11, wherein the second control valve comprises:

a spool valve member which has a second and a third land having a second, and a third diameter, respectively, that differ from each other, and which is movable between a drain position at which the spool valve member drains the third frictional engagement element and a non-drain position at which the spool valve member does not drain the third frictional engagement element;

a third hydraulic chamber which receives the fifth hydraulic pressure, so that the fifth hydraulic pressure acts on a pressure receiving area corresponding to a difference of the second and third diameters of the second and third lands and thereby produces a thrust to move the spool valve member toward the drain position; and a fourth hydraulic chamber which receives the control hydraulic pressure, so that the control hydraulic pressure acts on a surface of an axial end of the spool valve member and thereby produces a thrust to move the spool valve member toward the drain position.

13. The hydraulic control apparatus according to claim 10, wherein the first and third frictional engagement elements are both operated to establish a second operating state of the hydraulically operated mechanical apparatus; the first and fifth frictional engagement elements are both operated to establish a third operating state of the hydraulically operated mechanical apparatus; the first and second frictional engagement elements are both operated to establish a fourth operating state of the hydraulically operated mechanical apparatus; the second and fifth frictional engagement elements are both operated to establish a fifth operating state of the hydraulically operated mechanical apparatus; and the second and third frictional engagement elements are both operated to establish a sixth operating state of the hydraulically operated mechanical apparatus.

* * * * *